(12) United States Patent
Yanchar et al.

(10) Patent No.: US 7,853,889 B1
(45) Date of Patent: Dec. 14, 2010

(54) PALETTE-BASED GRAPHICAL USER INTERFACE

(75) Inventors: Christopher Charles Yanchar, Hooksett, NH (US); Mark Stephen Webb, Manchester, NH (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 12/341,947

(22) Filed: Dec. 22, 2008

Related U.S. Application Data

(60) Division of application No. 10/281,774, filed on Oct. 28, 2002, now Pat. No. 7,478,338, which is a continuation-in-part of application No. 09/905,298, filed on Jul. 12, 2001.

(60) Provisional application No. 60/391,336, filed on Jun. 25, 2002.

(51) Int. Cl.
*G06F 3/00* (2006.01)

(52) U.S. Cl. .................. 715/777; 715/788; 715/815; 715/797

(58) Field of Classification Search ........... 715/788, 715/815, 797, 777
See application file for complete search history.

(56) References Cited

U.S. PATENT DOCUMENTS

| | | | |
|---|---|---|---|
| 5,305,435 A * | 4/1994 | Bronson ............... | 715/777 |
| 5,392,387 A | 2/1995 | Fitzpatrick et al. | |
| 5,491,495 A * | 2/1996 | Ward et al. ........... | 345/173 |
| 5,546,528 A | 8/1996 | Johnston | |
| 5,680,562 A | 10/1997 | Conrad et al. | |
| 5,784,058 A | 7/1998 | LaStrange et al. | |
| 5,870,091 A * | 2/1999 | Lazarony et al. ......... | 715/804 |
| 5,874,958 A | 2/1999 | Ludolph | |
| 5,917,483 A | 6/1999 | Duncan et al. | |
| 6,039,047 A | 3/2000 | Rock et al. | |
| 6,166,736 A * | 12/2000 | Hugh ................... | 715/798 |
| 6,184,883 B1 | 2/2001 | Bates et al. | |
| 6,232,971 B1 | 5/2001 | Haynes | |
| 6,335,743 B1 | 1/2002 | Owings | |
| 6,335,745 B1 | 1/2002 | Amro et al. | |
| 6,512,529 B1 | 1/2003 | Janseen et al. | |
| 6,741,268 B1 | 5/2004 | Hayakawa | |
| 6,853,390 B1 | 2/2005 | Wandersleben et al. | |
| 6,857,105 B1 | 2/2005 | Fox et al. | |
| 7,010,753 B2 * | 3/2006 | Windl et al. ........... | 715/771 |
| 2002/0077921 A1 | 6/2002 | Morrison et al. | |
| 2002/0085040 A1 * | 7/2002 | Krolczyk et al. ......... | 345/777 |
| 2002/0163545 A1 | 11/2002 | Hii | |

(Continued)

OTHER PUBLICATIONS http://java.sun.com/products/jlf/ed2/book/HIG.Dialogs.html, Guidelines Home Page—Java Look and Feel Design Guidelines, 2nd Edition; Part III: The Components of the Java Foundation Classes 8:Dialog Boxes and Alert Boxes, Sun Microsystems, Inc. pp. 1-3, 2001.

(Continued)

*Primary Examiner*—Ryan F Pitaro
(74) *Attorney, Agent, or Firm*—Fish & Richardson P.C.

(57) ABSTRACT

A palette-based graphical user interface for a computer-implemented system. The palettes can be customized in a number of different ways to make them more user-friendly. More specifically, methods, computer readable media, and systems for dragging and dropping a stack of palettes onto another stack of palettes to create a combined stack of palettes are disclosed.

12 Claims, 39 Drawing Sheets

U.S. PATENT DOCUMENTS

2003/0222916 A1* 12/2003 Kuwata et al. .............. 345/777
2009/0007004 A1* 1/2009 Holecek et al. ............. 715/779

OTHER PUBLICATIONS http://java.sun.com/products/jlf/ed2/book/HIG.Glossary.html, Guidelines Home page—Java Look and Feel Design Guidelines, $2^{nd}$ Edition: Part IV: Backmatter: Glossary, Sun Microsystems, Inc. pp. 1-15, 2001.

* cited by examiner

PALETTE-BASED GRAPHICAL USER INTERFACE

CROSS-REFERENCE TO RELATED APPLICATIONS

This application is a divisional of and claims priority to U.S. application Ser. No. 10/281,774 (now U.S. Pat. No. 7,478,338), filed on Oct. 28, 2002, which is a continuation-in-part of and claims priority to U.S. application Ser. No. 09/905,298, filed Jul. 12, 2001, and which claims the benefit under 35 U.S.C. §119(e) of U.S. Provisional Application No. 60/391,336, filed Jun. 25, 2002. The entire contents of all applications in the above chain of priority claims are hereby incorporated by reference.

BACKGROUND OF THE INVENTION

1. Field of the Invention

The present invention relates generally to user interfaces for computer-implemented systems, and in particular, to a palette-based graphical user interface.

2. Description of the Related Art

The use of graphical user interfaces is well known in the art. Most computer programs use a graphical user interface (GUI) to display a graphical representation of various electronic documents, images, text, etc.

Some programs provide palettes that help users create documents, images, text, etc., wherein these palettes contain tools, controls, functions, objects or other elements. However, most programs only provide limited functionality for using palettes. Typically, a palette can be customized by a user in only limited ways. Consequently, palettes and their contents may not be easily accessible to the user.

Accordingly, what is needed is an improved palette-based graphical user interface. Specifically, there is a need in the art for improved techniques for customizing palettes to make them more useable.

SUMMARY OF THE INVENTION

A palette-based graphical user interface for a computer-implemented system. The palettes can be customized in a number of different ways to make them more user-friendly.

With regard to presentation, the palettes have a unique look, including a non-rectangular window, vertical title bars and tabs, and vertical text, as well as bottom corner resizing, edge snapping, auto-hide capability, pan scrolling, and the ability to force a theme.

With regard to functionality, the palettes include a number of new features, related to stacking and tearing off, stacking and tear-off restrictions, XOR feedback for overlapping palettes, tab overflow, text eliding, palette schemes, and palette catalogs.

More specifically, methods, computer readable media, and systems for dragging and dropping a stack of palettes onto another stack of palettes to create a combined stack of palettes are disclosed.

In one implementation, the method includes: displaying a first stack of palettes and a second stack of palettes in the GUI, the first stack of palettes and the second stack of palettes each including a plurality of tabbed palettes and a title bar, and each tabbed palette including a tab; receiving first user input in the GUI to grab the title bar of the first stack of palettes and to drag the first stack of palettes into proximity with the second stack of palettes; in response to receiving the first user input, displaying an XOR outline around the second stack of palettes indicating that the second stack of palettes is an eligible drop target; receiving second user input to drop the dragged first stack of palettes onto the second stack of pallets to create a combined stack of palettes; and in response to receiving the second user input, displaying a combined stack of pallets comprising the tabbed pallets from both the first stack and the second stack of palettes, the combined stack taking on one or more characteristics of the second stack of palettes, and the one or more characteristics including size, justification and auto-hide state of the second stack of palettes.

BRIEF DESCRIPTION OF THE DRAWINGS

Referring now to the drawings in which like reference numbers represent corresponding parts throughout:

FIG. 6A illustrates an Auto-hide Toggle Button with auto-hide disabled, while

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

1 Overview

A palette-based graphical user interface for a computer-implemented system. The palettes can be customized in a number of different ways to make them more user-friendly.

2 Hardware and Software Environment

Figure 1:
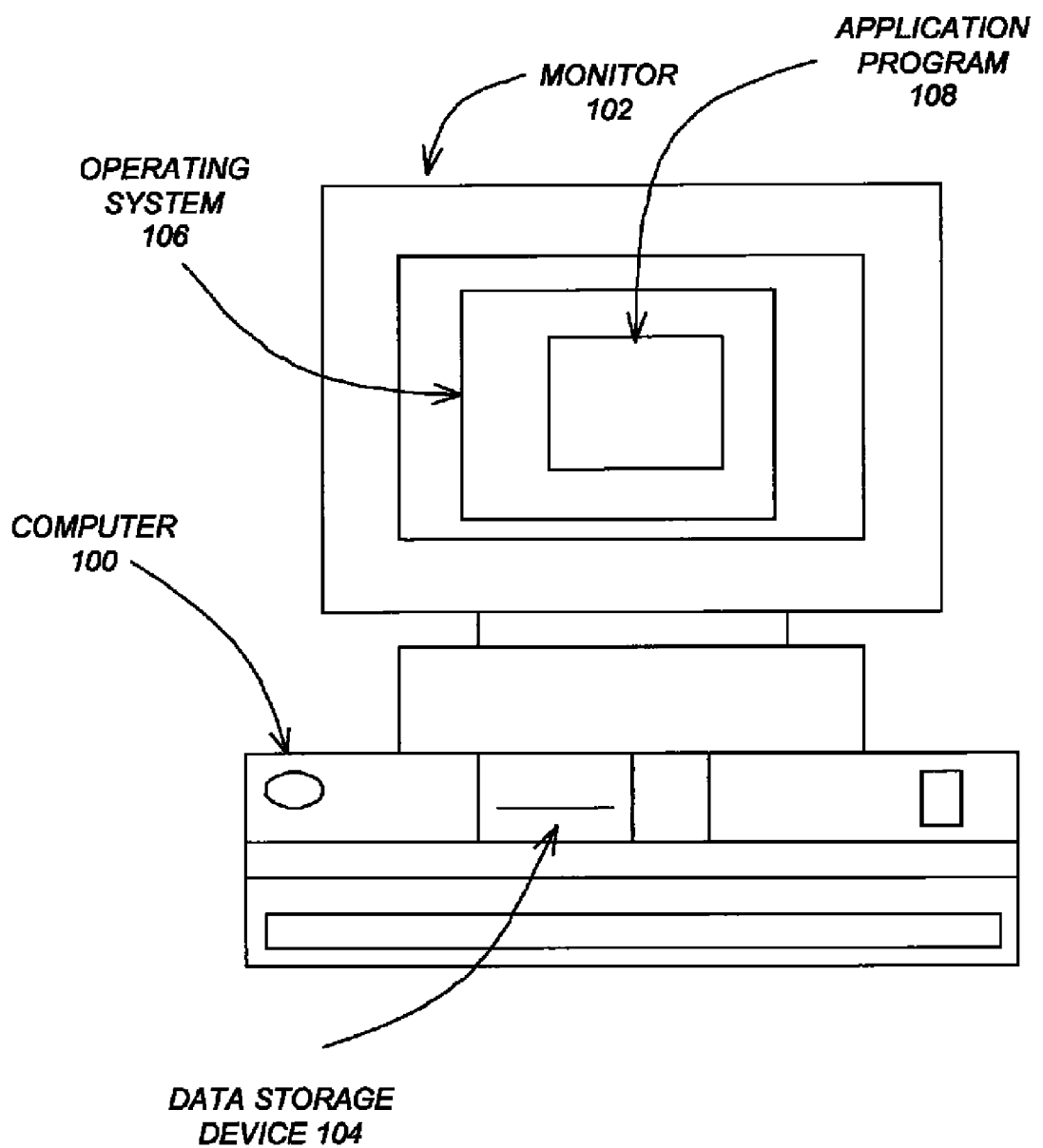
FIG. 1 is an exemplary hardware and software environment used to implement one or more embodiments of the invention.

FIG. 1 is an exemplary hardware and software environment used to implement one or more embodiments of the invention. The preferred embodiment of the present invention may be implemented using a computer 100, which generally includes, inter alia, a monitor 102 or other display device, one or more data storage devices 104, and any number of other devices. Those skilled in the art will recognize that any combination of the above components, or any number of different components, peripherals, and other devices, may be used with the computer 100.

The computer 100 operates under the control of an operating system 106, which is represented by a window displayed on the monitor 102. The operating system 106, in turn, controls the operation of one or more application programs 108, which is also represented by a window displayed on the monitor 102. The preferred embodiment of the present invention comprises a set of new and improved palette functionality that is implemented in the application program 108, although the set of new and improved palette functionality may be implemented in the operating system 108. Generally, both the operating system 106 and application program 108 comprise instructions and/or data that are embodied in or readable from a device, media, carrier, or signal, e.g., one or more fixed and/or removable data storage devices 104 connected directly or indirectly to the computer 100, one or more remote devices coupled to the computer 100 via a data communications device, etc. Moreover, these instructions and/or data, when read, executed, and/or interpreted by the computer 100, cause the computer 100 to perform the logic necessary to implement and/or use the present invention.

Thus, the present invention may be implemented as a method, apparatus, or article of manufacture using standard programming and/or engineering techniques to produce software, firmware, hardware, or any combination thereof. The term "article of manufacture", or alternatively, "computer program carrier", as used herein is intended to encompass instructions and/or data accessible from any computer-readable device, media, carrier or signal Of course, those skilled in the art will recognize many modifications may be made to this configuration without departing from the scope of the present invention. Specifically, those skilled in the art will recognize that the exemplary environment illustrated in FIG. 1 is not intended to limit the present invention. Indeed, those skilled in the art will recognize that other alternative environments may be used without departing from the scope of the present invention.

3 Application Program

Figure 2:
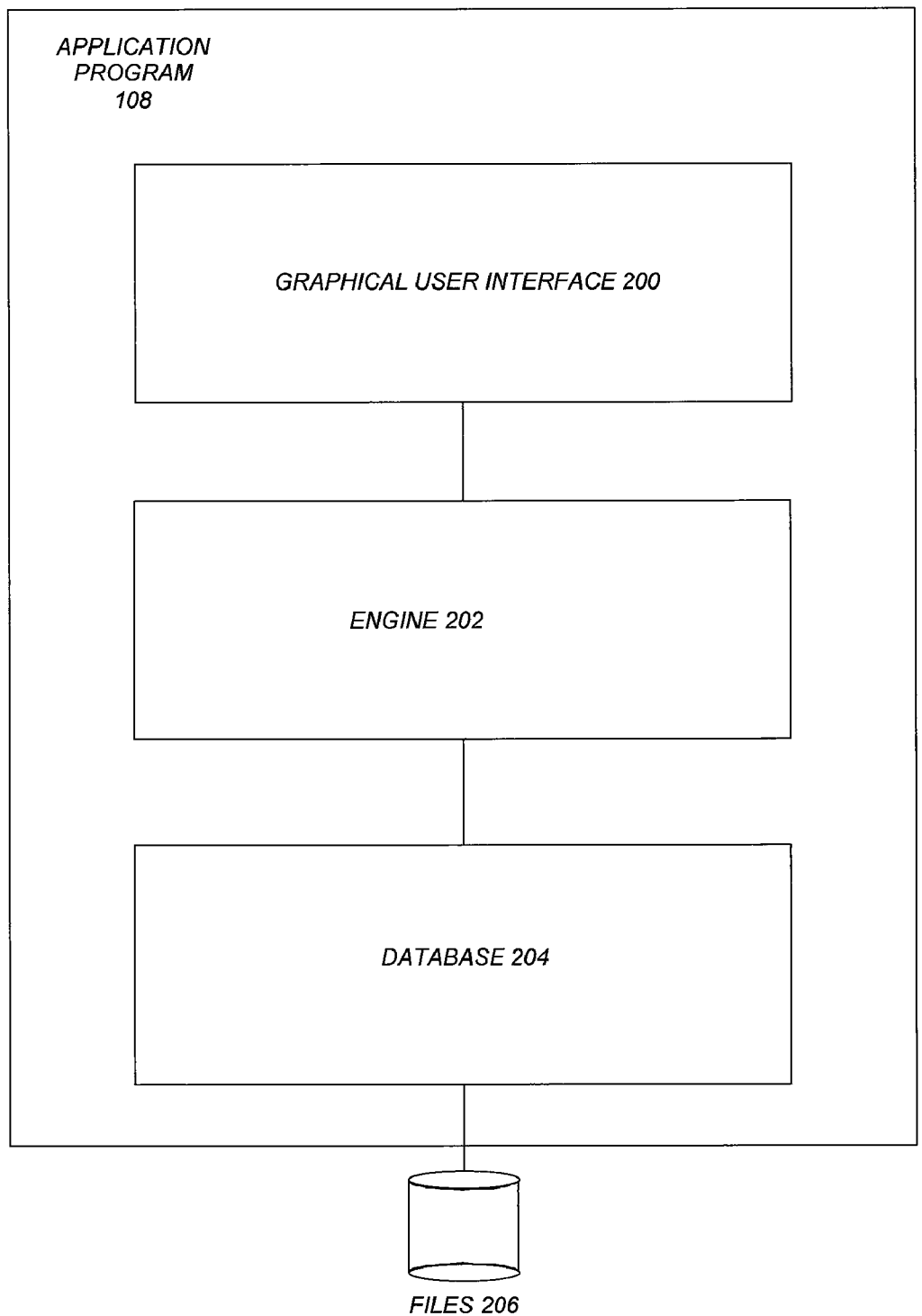
FIG. 2 is a block diagram that illustrates components of the application program, according to a preferred embodiment of the present invention.

FIG. 2 is a block diagram that illustrates the components of the application program 108 in accordance with a preferred embodiment of the present invention. In this embodiment, the application program 108 includes a Graphical User Interface 200, an Engine 202, and a DataBase 204 for storing one or more electronic documents or other entities in one or more Files 206. Those skilled in the art will recognize that the application program 108 may include other or different components while still embodying the present invention.

The Graphical User Interface 200 displays information to the operator and provides the functionality for the operator's interaction with the application program 108. The Engine 202 processes the electronic documents stored in the Files 206 and delivers the results to the Graphical User Interface 200 for display on the monitor 102. The DataBase 204 stores information generated by the application program 108, such as one or more electronic documents containing graphical, textual or other data, in the Files 206.

4 Operation of the Palette-based Graphical User Interface

The preferred embodiment of the present invention introduces a new palette-based Graphical User Interface 200. These palettes introduce new ways of working to an end user. Specifically, the present invention introduces space-saving, fully customizable, tabbed palette sets.

4.1 Terminology

4.1.1 Palette

A palette is a window that can contain tools, controls, functions, objects or other elements.

4.1.2 Palette Set

A palette set is a collection of palettes used to group palettes that support a common task, as well as give the user a way to save space within their workspace. Generally, the palettes within a palette set are stacked, although they may be docked.

5 Palette Presentation

5.1 Unique Look

Figure 3:
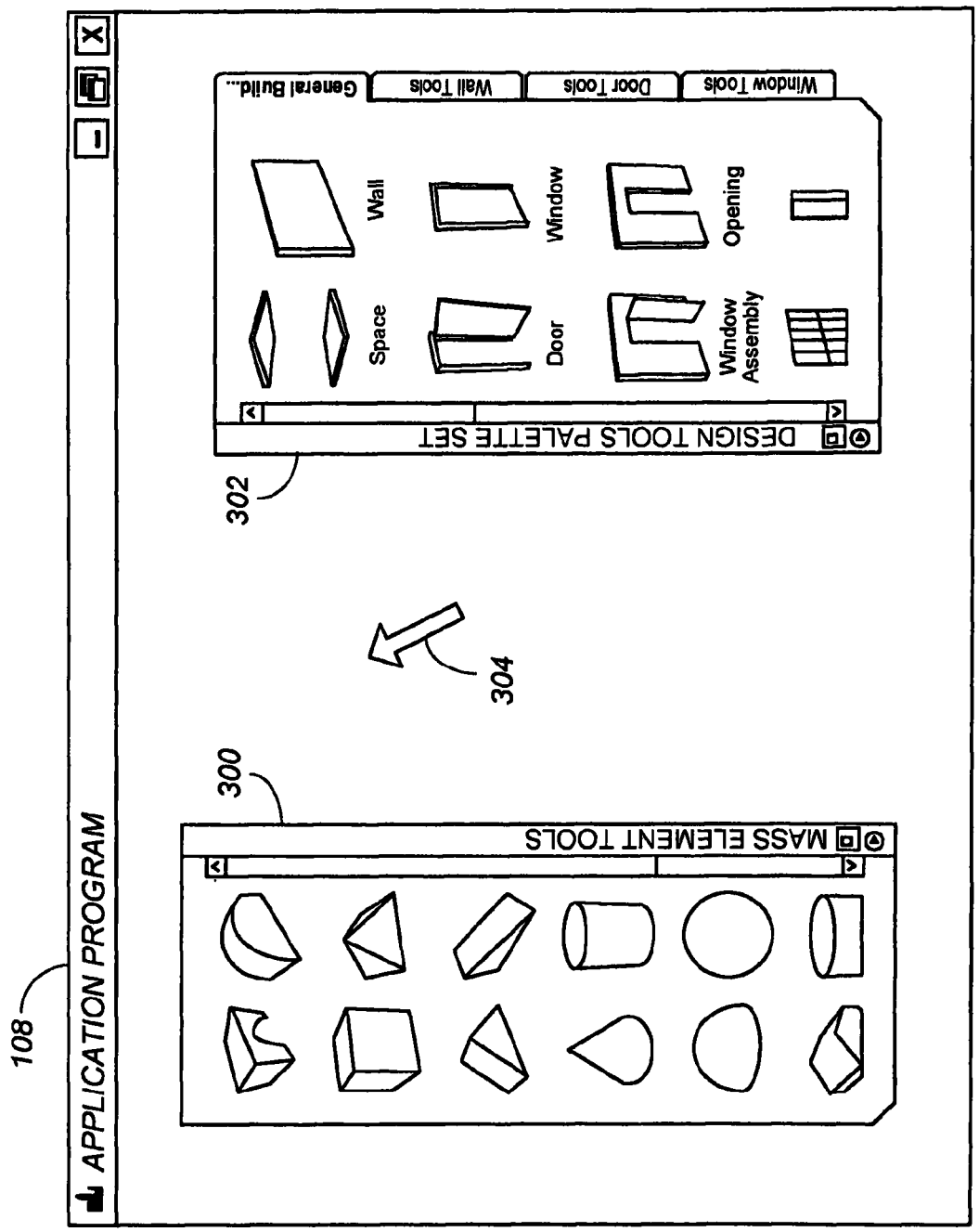
FIG. 3 is an illustration of an application program window, according to a preferred embodiment of the present invention.

FIG. 3 is an illustration of the application program 108 window according to a preferred embodiment of the present invention. Specifically, FIG. 3 illustrates some basic attributes of palettes, by means of a single palette 300 and a tabbed stack of multiple palettes 302 comprising a palette set. Each of the icons found within the palettes 300 and 302 represents a graphical entity in this illustration, although icons in other palettes may represent other entities, such as tools, controls, functions, objects or other elements. A cursor 304 is used to select or "drag and drop" one or more of the icons from the palettes 300 and 302 onto the application program 108 window, in a manner well known in the art.

5.1.1 Non-Rectangular Window

The basic shape of a palette 300 or 302 is as shown in FIG. 3, where the tabs and bottom resize corner form a non-rectangular window. The bottom resize corner comprises a chamfered or beveled corner. When selected by a cursor, the bottom resize corner may be dragged to resize the palettes 300 or 302.

5.1.2 Vertical Title Bar, Tabs and Text

As opposed to normal windows, the palettes 300 and 302 of FIG. 3 have their title bars and tabs running vertically, with the text labels also running vertically.

5.1.3 Transparency

Figure 4:
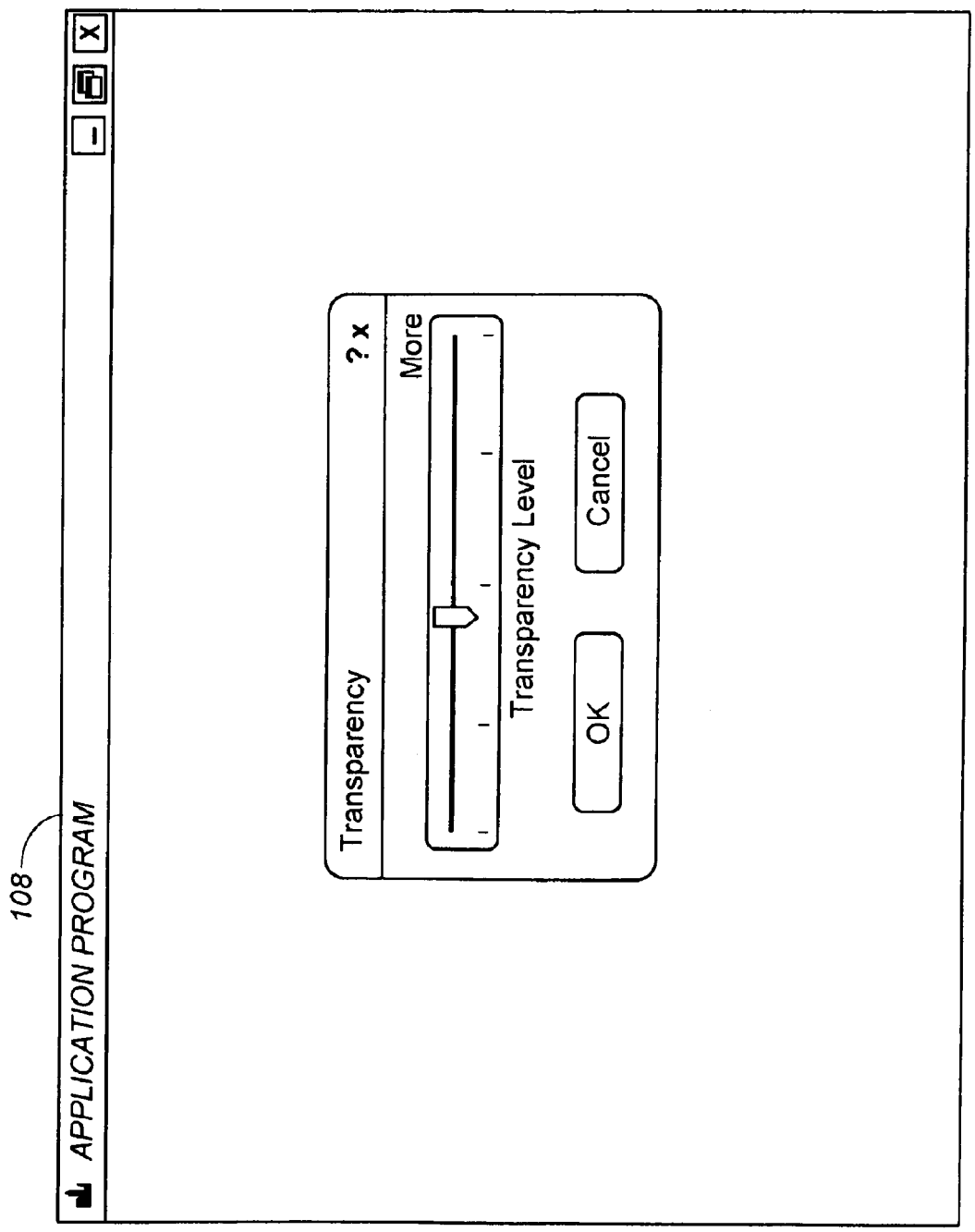
FIG. 4 is an illustration of a Transparency Worksheet dialog, according to a preferred embodiment of the present invention.

The user can set the transparency level of palettes using a Transparency Worksheet dialog 400, such as is shown in application program 108 window of FIG. 4. This provides the user with an illusion of regained screen real estate. Transparency is available on operating systems 106 that support it, such as MICROSOFT WINDOWS XP®, MICROSOFT WINDOWS 2000®, and MICROSOFT WINDOWS ME®.

5.1.4 Drop Shadow

Referring again to FIG. 3, palettes 300 and 302 have a drop shadow coming from an angle of 120 degrees. A drop shadow is available on operating systems that support it, such as MICROSOFT WINDOWS XP®, MICROSOFT WINDOWS 2000®, and MICROSOFT WINDOWS ME®.

5.2 Snapping

When a palette 300 or 302 is within 10 pixels of another palette (top, bottom, left, or right edges), the edge of the application program 108 window, or the edge of the screen, it snaps to that edge leaving a 1 pixel buffer space. This aids in positioning of the palettes 300 or 302. When the user snaps a palette 300 or 302 to the left or right of the application program 108 window, the vertical title bar will flip justification so that it is on the inward side of the palette 300 or 302, if required.

5.3 Moving and Resizing

Palettes 300 or 302 are moved by grabbing the title bar and holding down the left mouse button. Alternatively, palettes 300 or 302 can be moved using the standard method of invoking a 'Move' command from a menu. However, when palettes 300 or 302 are moved, they move 'fully-rendered,' and the application program 108 does not just simply draw an XOR outline.

In addition to the bottom resize corner, palettes 300 or 302 are resizable by using the standard methods of mouse or keyboard, for example, by dragging the top, bottom, and non-title bar sides.

5.4 Auto-Hide

Figure 5:
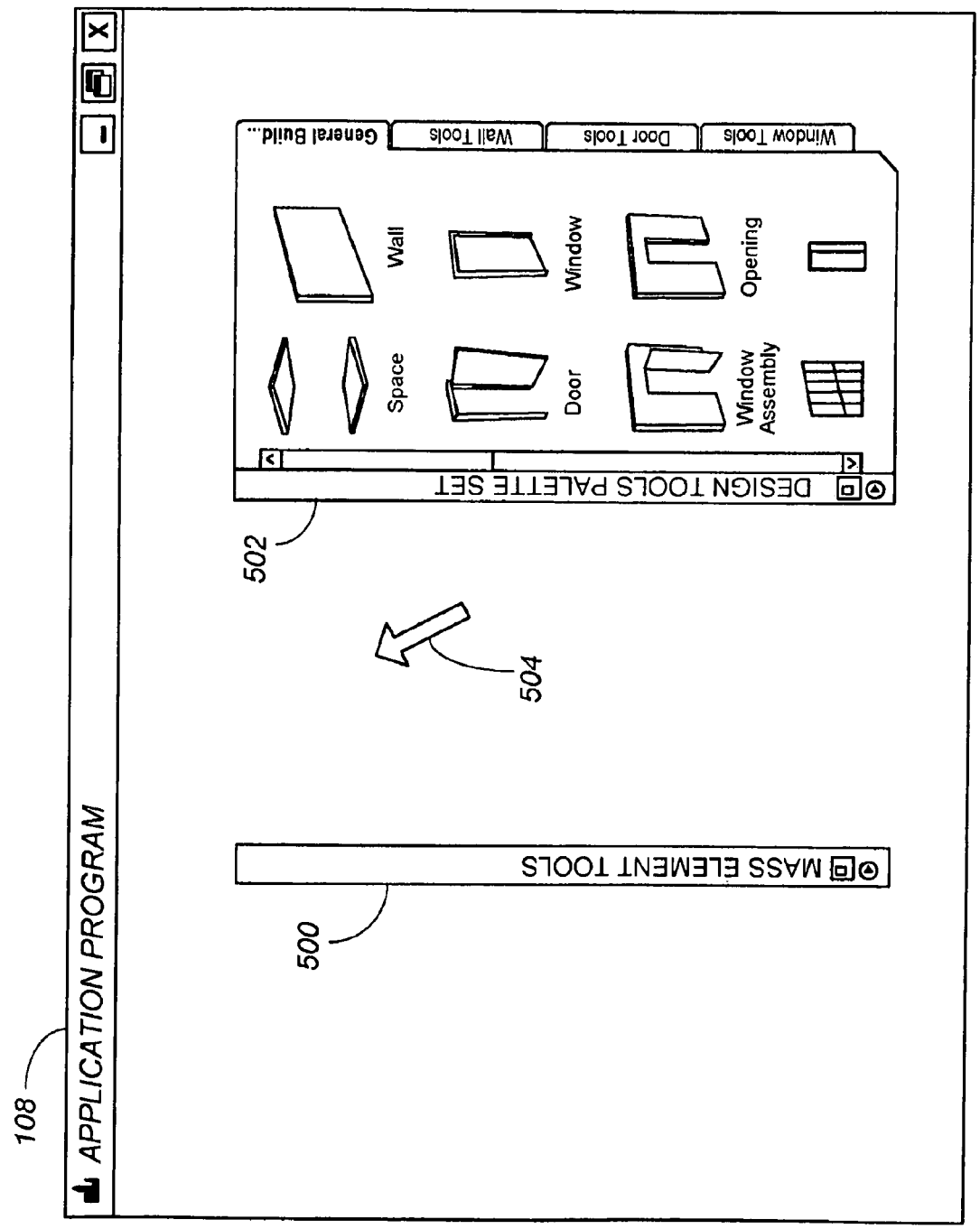
FIG. 5 is an illustration of an application program window having both a palette with auto-hide enabled, as well as a palette with auto-hide disabled, according to a preferred embodiment of the present invention.

FIG. 5 is an illustration of the application program 108 window having both a palette 500 with auto-hide enabled, as well as a palette 502 with auto-hide disabled. Palettes utilize an auto-hide functionality to give them a slimmer, space-saving presentation. Note that the auto-hide functionality is an adaptation of technology described in U.S. patent application Ser. No. 09/905,298, filed on Jul. 12, 2001, by Mark S. Webb, entitled "COLLAPSIBLE DIALOG WINDOW," which application is incorporated by reference herein.

When auto-hide is enabled, and the user moves the cursor 504 off of the title bar, the palette window disappears, leaving just the title bar of the palette. When the user moves the cursor 504 back over the title bar, the palette window reappears.

Figure 6A:
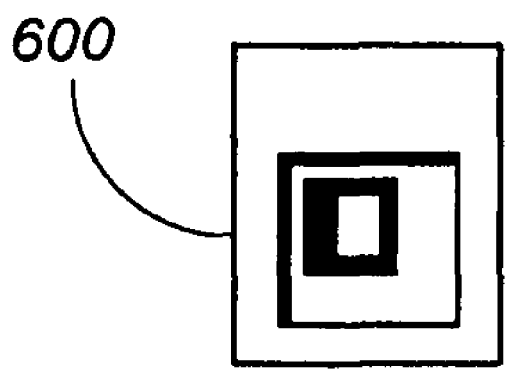
Figure 6B:
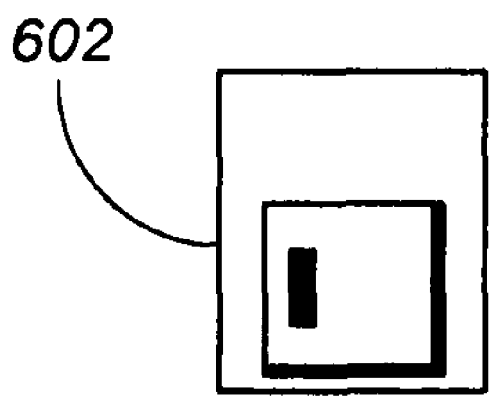
FIG. 6B illustrates an Auto-hide Toggle Button with auto-hide enabled, according to a preferred embodiment of the present invention.

The user enables/disables auto-hide by depressing the auto-hide button on the title bar of the palette 500 or 502. FIG. 6A illustrates an Auto-hide Toggle Button 600 with auto-hide disabled, while FIG. 6B illustrates an Auto-hide Toggle Button 602 with auto-hide enabled.

5.5 Closing and Opening Palettes

Figure 7:
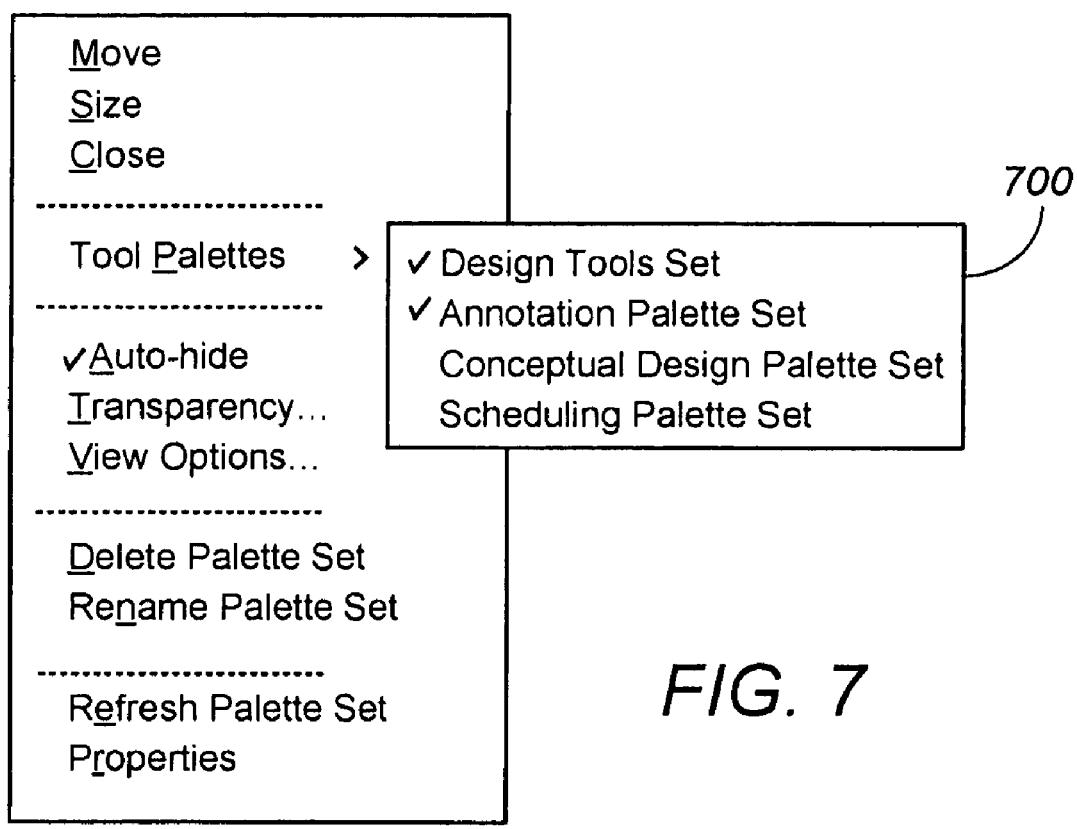
FIG. 7 illustrates a Palette Menu, according to a preferred embodiment of the present invention.

Palettes can be temporarily hidden by closing them from the following locations in the GUI 200:

- The X button on the top of the palette's title bar.
- Choosing "Close" on the palette properties menu invoked by clicking the button at the bottom of the palette.
- Toggling the close/open state from the palette menu, under 'Tool Palettes >' from the 'Window' pull down menu under 'Tool Palettes'. FIG. 7 illustrates a Palette Menu 700 according to the preferred embodiment of the present invention.

5.6 Pan Scrolling

Figure 8:
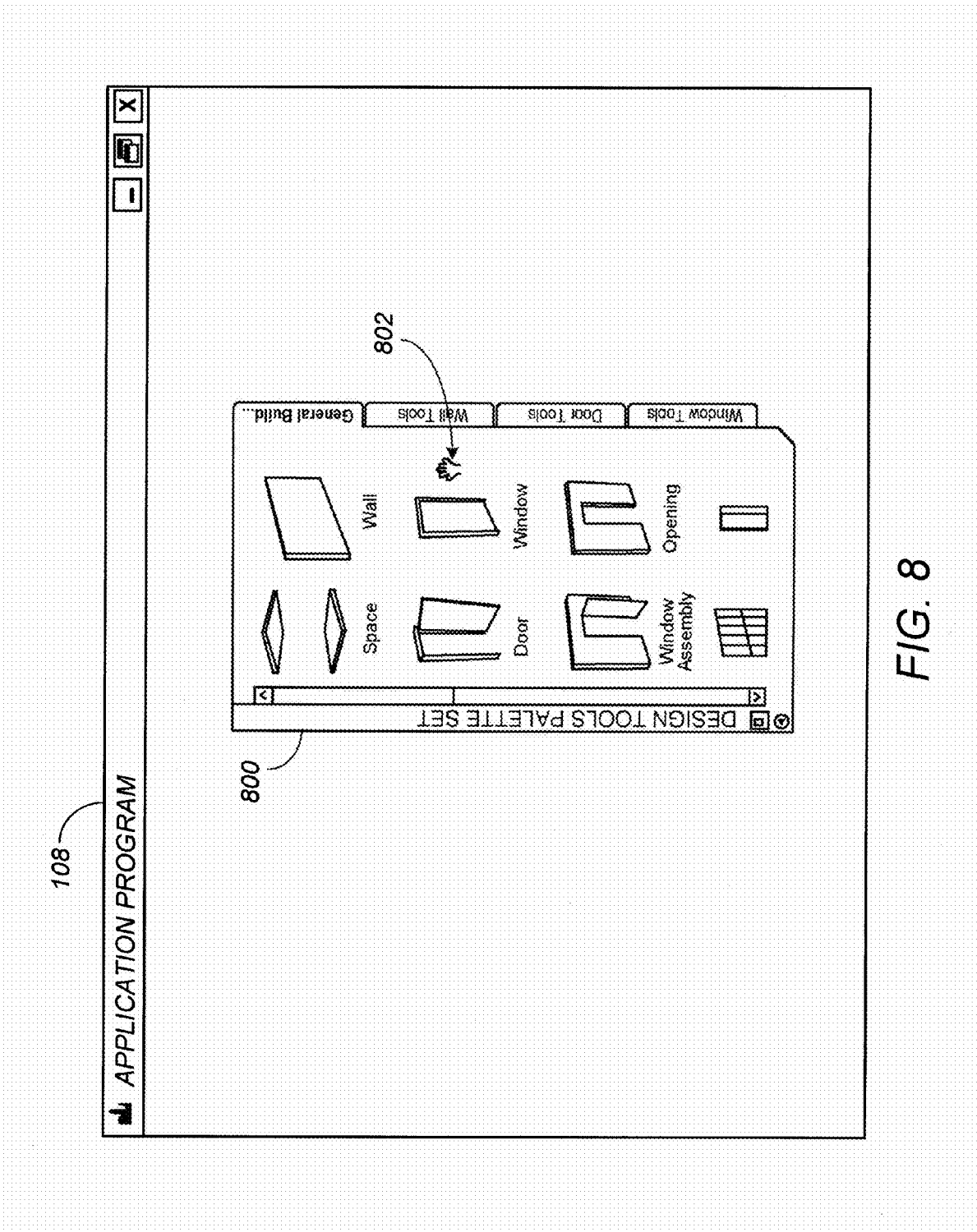
FIG. 8 illustrates pan scrolling, according to a preferred embodiment of the present invention.

Palette contents can be scrolled using a scroll bar adjacent the title bar of the palette, as well as by 'pan scrolling' As shown in FIG. 8, when the cursor is over the background area of a palette 800, a hand icon 802 is displayed that enables the user to pan scroll the contents of the palette 800 up and down by pressing down the left mouse button.

5.7 Ability to Force a Theme

Palettes have the ability to specify all colors and fonts uniquely per application and per feature, independent of the operating system colors and fonts. The user has the option to turn this off, enabling normal operating system 106 colors and fonts.

6 Palette Functionality

This section describes the functional aspects of the palettes.

6.1 Stacking and Tear-Off

6.1.1 Stacking by Title Bar or Tab

Palettes can be stacked together into a palette set by grabbing a palette's title bar or tab, dragging the palette and dropping it onto one or more other palettes. An entire palette set can be stacked onto another palette or palette set in the same manner.

6.1.2 Single Palette Vs. Palette Set

A single palette is technically a palette set of one, but the set is irrelevant in this case. A single palette does not display a tab, and the palette name occupies the palette title bar, temporarily replacing the palette set to which it belonged.

6.1.3 Stacking Drop Source and Target

A palette is merged into a palette set by positioning the drag pointer (i.e., cursor) dragging the palette anywhere over an eligible palette or palette set drop target at the time of release of the left mouse button. This can occur at the end of a move by title bar or move by tab or tear-off tabs operation. Whenever the pointer by which a palette or palette set is being dragged is over a palette that is an eligible drop target, the target palette rolls out if auto-hidden, and the outline of the target palette is XOR'ed. This is meant to indicate clearly that a merge would take place if the palette being dragged is dropped at that location, even if the palette being dragged is larger and obscures the target palette. If the drag cursor is over two or more palettes that are eligible drop targets, the palette that is the uppermost drop target has priority. The dragged palette or palette set drops on top (uppermost position along side, first in the list) of the target palette and becomes the currently active palette of the palette set. Dropped palettes take on the size, justification, and auto-hide state of the target palette.

6.1.4 XOR Feedback for Overlapping Palettes

Figure 9:
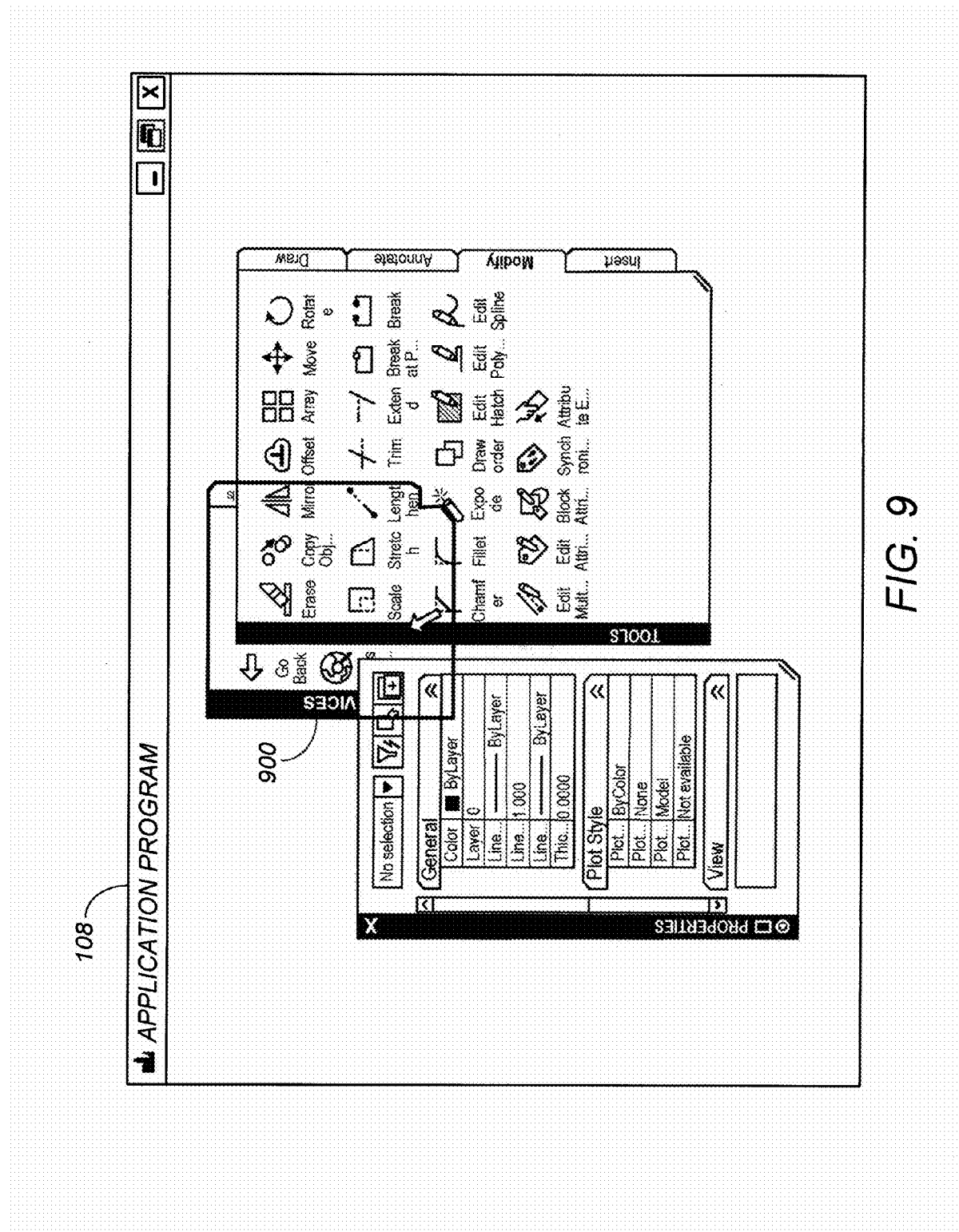
FIG. 9 is an illustration of an application program window and overlapping palette feedback during a stacking operation, according to a preferred embodiment of the present invention.

FIG. 9 is an illustration of the application program 108 window and overlapping palette 900 feedback during a stacking operation. An XOR indication of target acquisition is a 3-pixel-wide outline of the target palette 900, lying immediately outside the border line of the palette 900, following the entire contour of the palette 900, and including any tabs shown. (It is believed that the XOR line entirely outside the palette 900 gives the clearest indication, whereas partially overlapping border and palette colors give a complicated and less distinct visual effect.).

6.1.5 Multiple Select of Palettes

Multiple palettes can be selected by holding down the SHIFT and/or CTRL key and then left mouse clicking on each tab.

6.1.6 Tearing Off a Palette

A palette, or multiple palettes, is torn-off of a palette set by selecting the palette's tab and tearing the palette off of the palette set.

6.1.7 Grouping Behavior

Figure 10A:
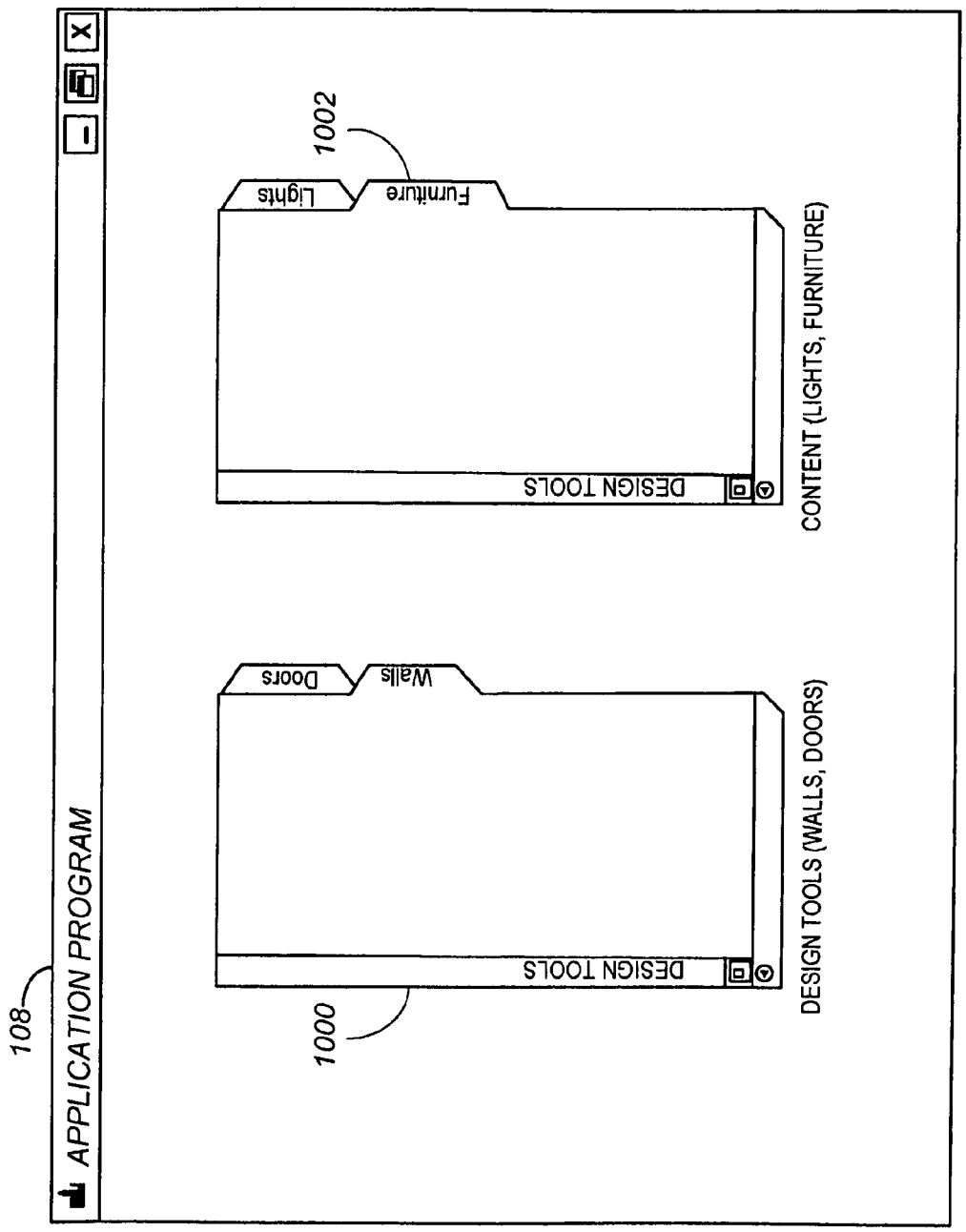
FIGS. 10A, 10B and 10C together are an illustration of an application program window and the grouping behavior of palettes during a stacking or tearing off operation, according to a preferred embodiment of the present invention.
Figure 10B:
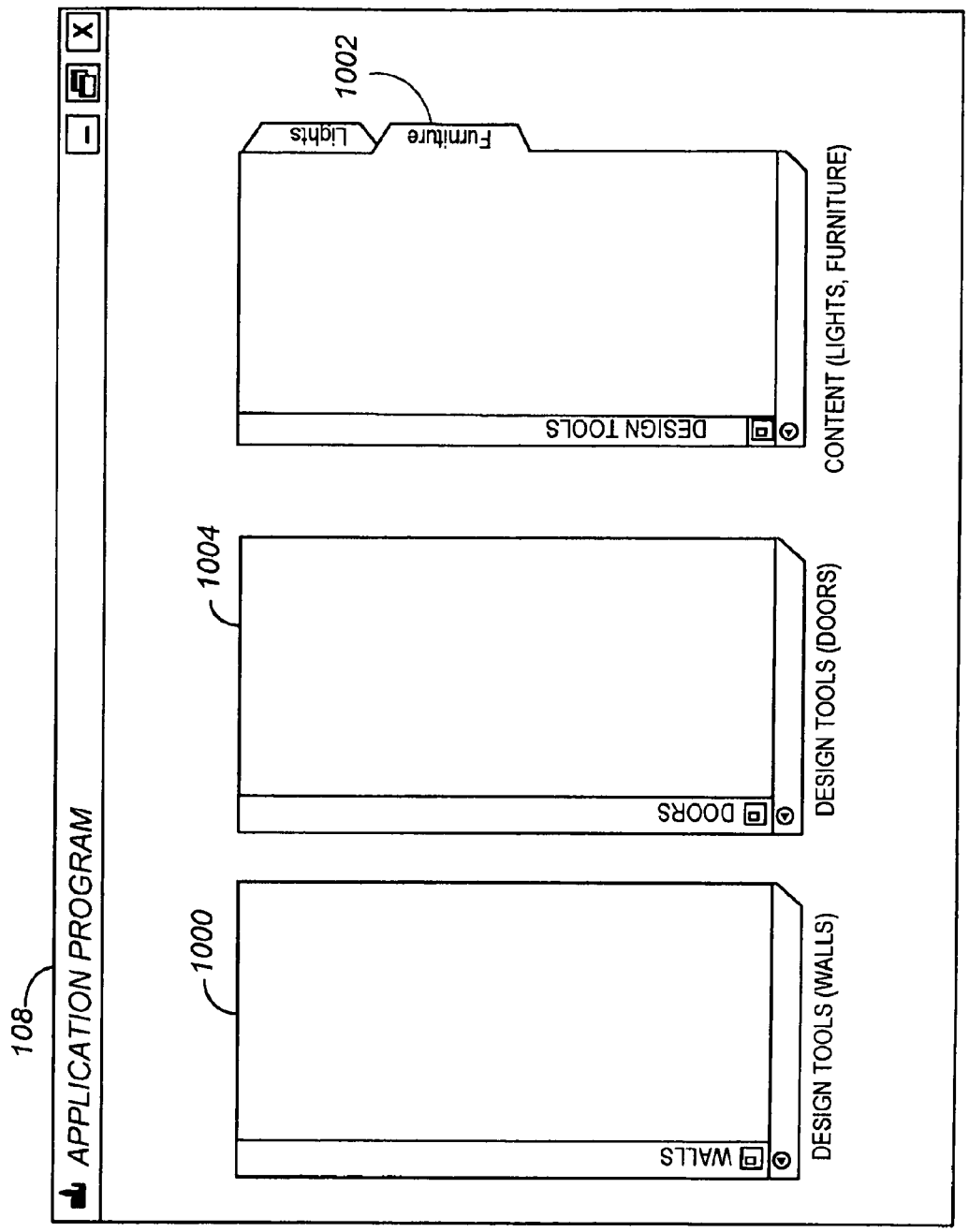
Figure 10C:
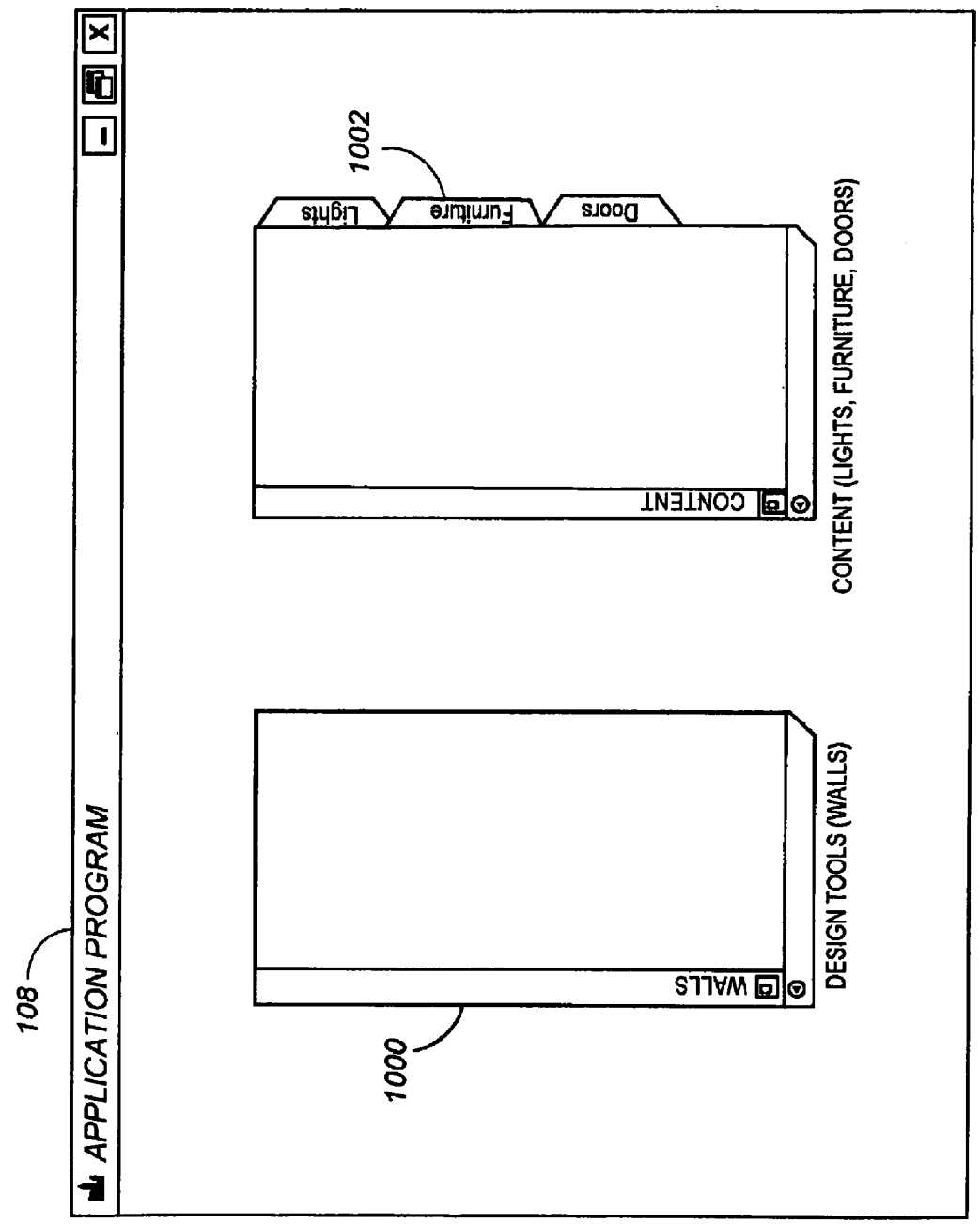

FIGS. 10A, 10B and 10C together are an illustration of the application program 108 window and the grouping behavior of palettes during a stacking or tearing off operation. When palettes are stacked or torn off, there exists a mechanism to track the set to which an individual palette belongs. This offers the user the flexibility of temporarily working with less palettes, and flexibility when reorganizing their palettes, without the side effect of losing the palette set name.

As shown in FIG. 10A, there exist two palette sets: one labeled as the "DESIGN TOOLS" palette set 1000 and one labeled as the "CONTENT" palette set 1002. Each of the sets 1000 and 1002 contains two palettes.

As shown in FIG. 10B, the user tears off the Doors palette 1004 off of the DESIGN TOOLS palette set 1000 and floats it. This then remove the tabs from the palette set 1000, as it is now a set 1000 having only one palette. However, palette 1004 still has a hidden association to the DESIGN TOOLS palette set 1000.

As shown in FIG. 10C, the user then stacks the Doors palette 1004 onto the CONTENT palette set 1002. This then breaks the link between the DESIGN TOOLS palette set 1000 and the Doors palette 1004, and the Doors palette 1004 is now associated with the CONTENT palette set 1002.

6.1.8 Stacking and Tear-Off Restrictions

Palettes can be flagged to restrict stacking to only certain palettes and can also be flagged to not allow the user to tear them apart.

6.2 Tab Overflow

Figure 11:
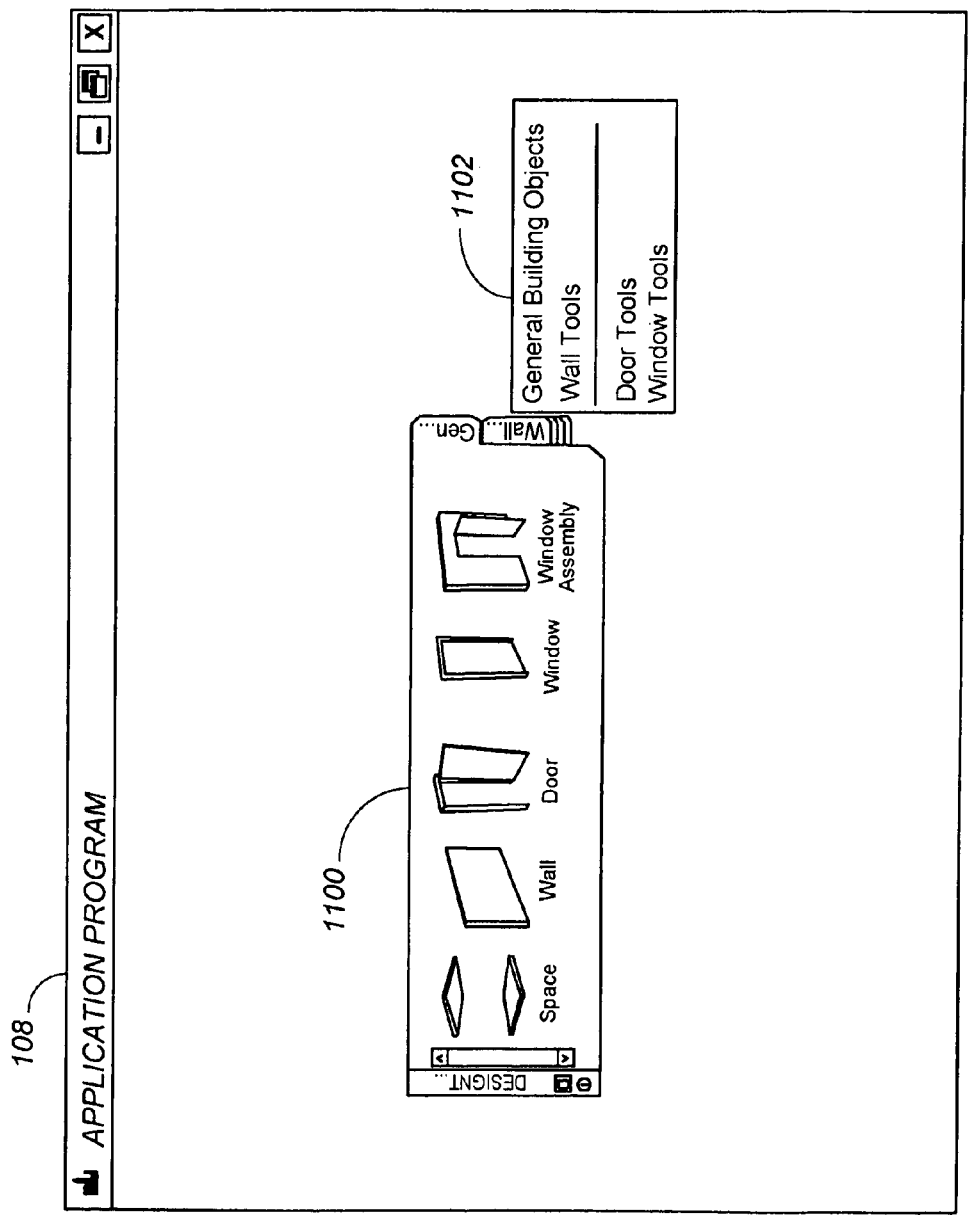
FIG. 11 is an illustration of an application program window and the tab overflow behavior of a palette set, according to a preferred embodiment of the present invention.

FIG. 11 is an illustration of the application program 108 window and the tab overflow behavior of a palette set 1100 according to the preferred embodiment of the present invention. When a palette set 1100 is resized down, the tabs proportionally resize down as well. When a minimum is reached, the bottom tabs overflow, so that the text labels on the tabs are not visible, and the overflowed tabs are contained on a fly out menu 1102. The fly out menu 1102 shows all the tabs in the palette set 1100, wherein exposed palettes are above a separator line, and hidden palettes are below the separator line.

6.3 Title Bar and Tab Text Eliding

When the text labels for a palette does not fit within the available space, the text elides. When the user hovers over the elided text, a text tip displays the full name.

6.4 User-Definable Naming of Palette Sets and Palettes

Palette Sets and Palettes can be named by the user. Any characters are allowed, of any length, including a blank name. Palettes are identified and tracked by a unique GUI ID.

6.5 Saving Palettes in Schemes

A Palette Layout is the collection of Palettes and their state on the screen. Generally, a Palette Layout will have a name (e.g. "My Construction Documentation Tool Set"), and a description. The state refers to the following:

Screen location,
Size,
Transparency level,
Justification,
Auto-hide state,
Visibility,
Currently selected palette,
Currently selected tab,
Icon size, and
Icon arrangement.

Figure 12:
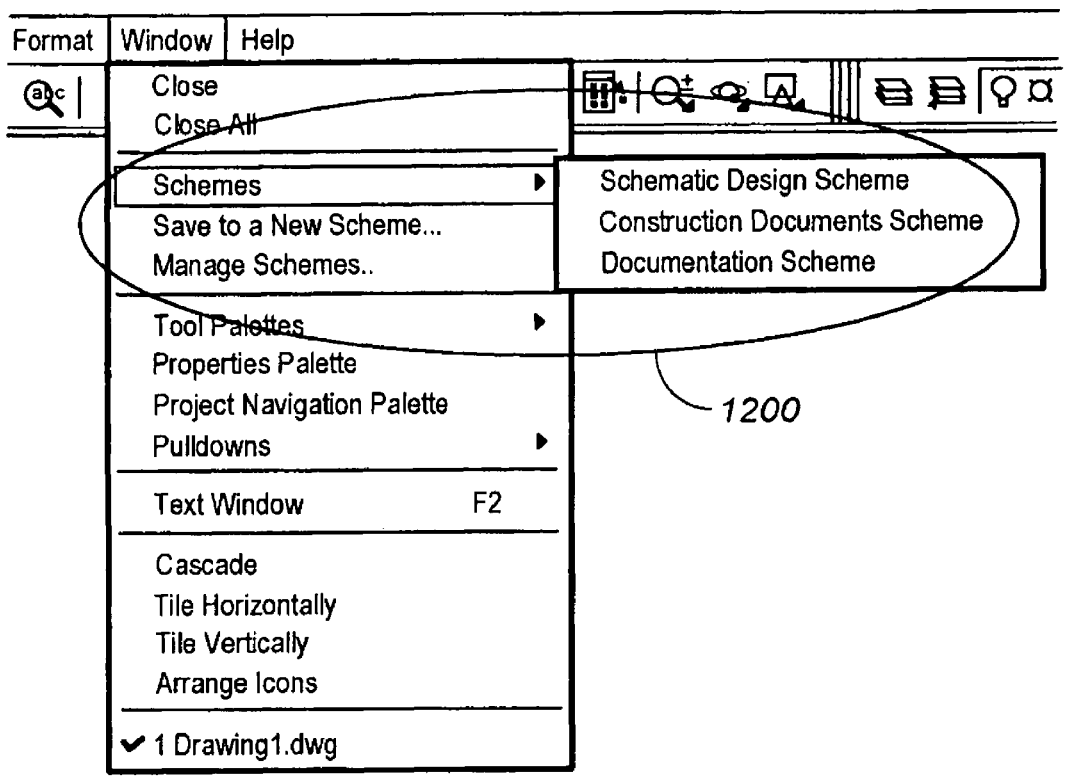
FIG. 12 illustrates a Scheme Management menu, according to a preferred embodiment of the present invention.

The user retrieves, manages, and creates their Schemes from two locations:

As described above in the section entitled, "Closing/Opening Palettes."
From the Window pull down menu. FIG. 12 illustrates a Scheme Management menu according to the preferred embodiment of the present invention.

6.6 Ability to Add and Remove Palettes

The user can add and remove palettes from their palette scheme, as well as create their own custom palettes. To add a palette to a scheme, the user drags and drops a palette from one of the following locations:

a Catalog,
an Internet web site, or
a File Explorer.

To remove a palette, the user chooses "Delete Palette" from the palette's context menu.

6.7 Ability to Drop a New Palette from an Internet Web Site or File Explorer When the user drops a palette from a File Explorer into the application program 108 window, the palette is immediately added to the current palette scheme and the palette is displayed in the application program 108 window.

The user can also use Autodesk's iDrop technology to drop a palette from an Internet web site into the application program 108 window. (Note that the iDrop technology is described in U.S. patent application Ser. No. 10/038,071, filed on Jan. 4, 2002, by Craig Storms and Soren Abildgaard, entitled "LIGHTWEIGHT SELF-CONTAINED SELF-EXPANDING PRODUCT DATA PACKAGE," which application is incorporated by reference herein.)

6.8 Integration with a Catalog

Figure 13:
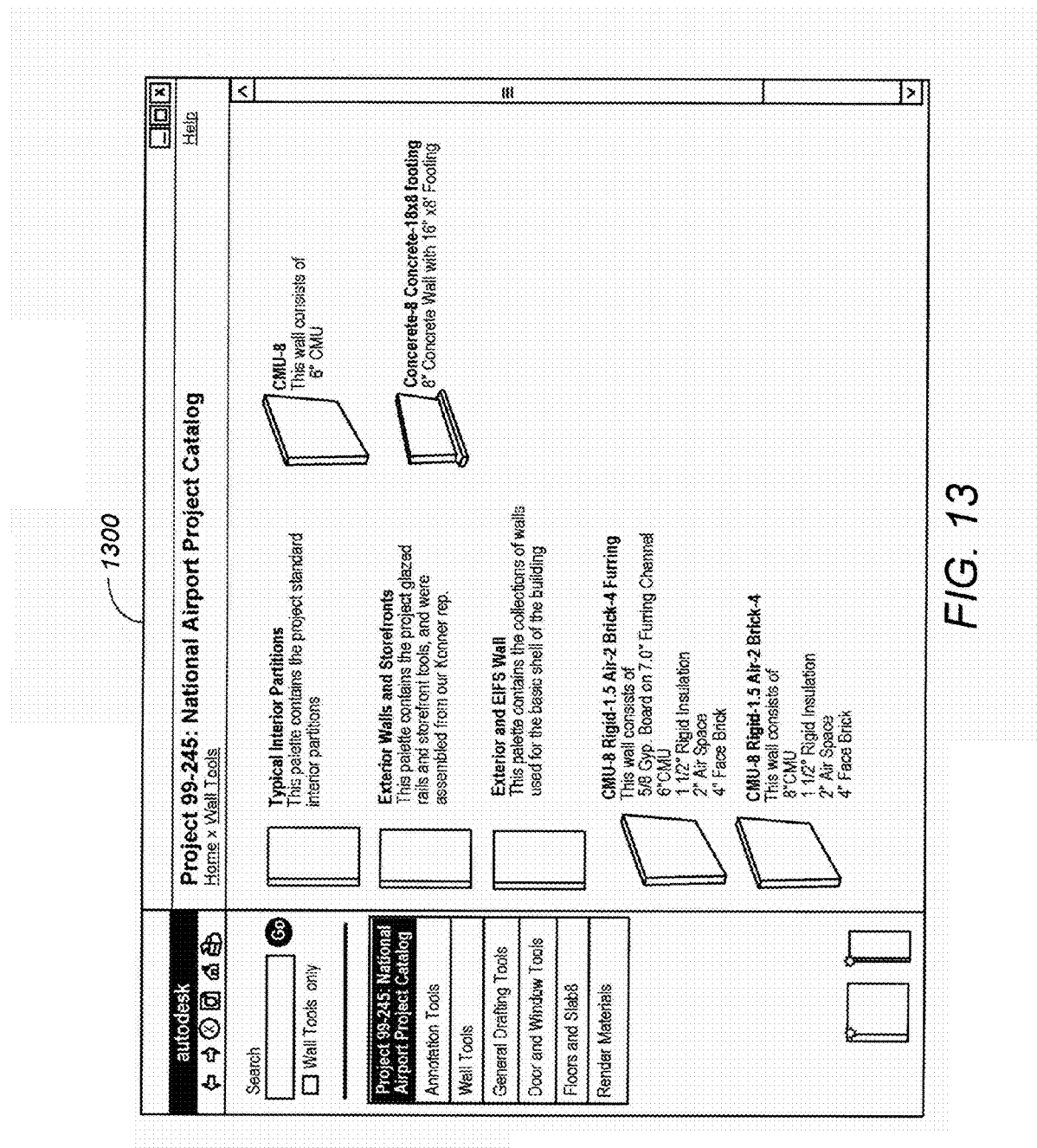
FIG. 13 illustrates a catalog that is displayed as an Internet page, according to a preferred embodiment of the present invention.

FIG. 13 illustrates a catalog that is displayed as an Internet page 1300 according to the preferred embodiment of the present invention. A major point of customization and extensibility of palettes is the ability for the user to create new palettes, save them in a catalog, share their palettes with other users, and retrieve palettes. As described above, when the user drops a palette from a catalog into the application program 108 window, the palette is immediately added to the current palette scheme and the palette is displayed in the application program 108 window.

6.9 Palettes are a Drop Source for Content

Palettes accept content items in several ways:

By dragging and dropping an object from a catalog onto the palette.
By dragging and dropping an object from the application program 108 window onto the palette.
By copying and moving an object from another palette onto the palette.
By dragging and dropping an object from an Internet web page onto the palette.

6.10 Palette Properties

Figure 14:
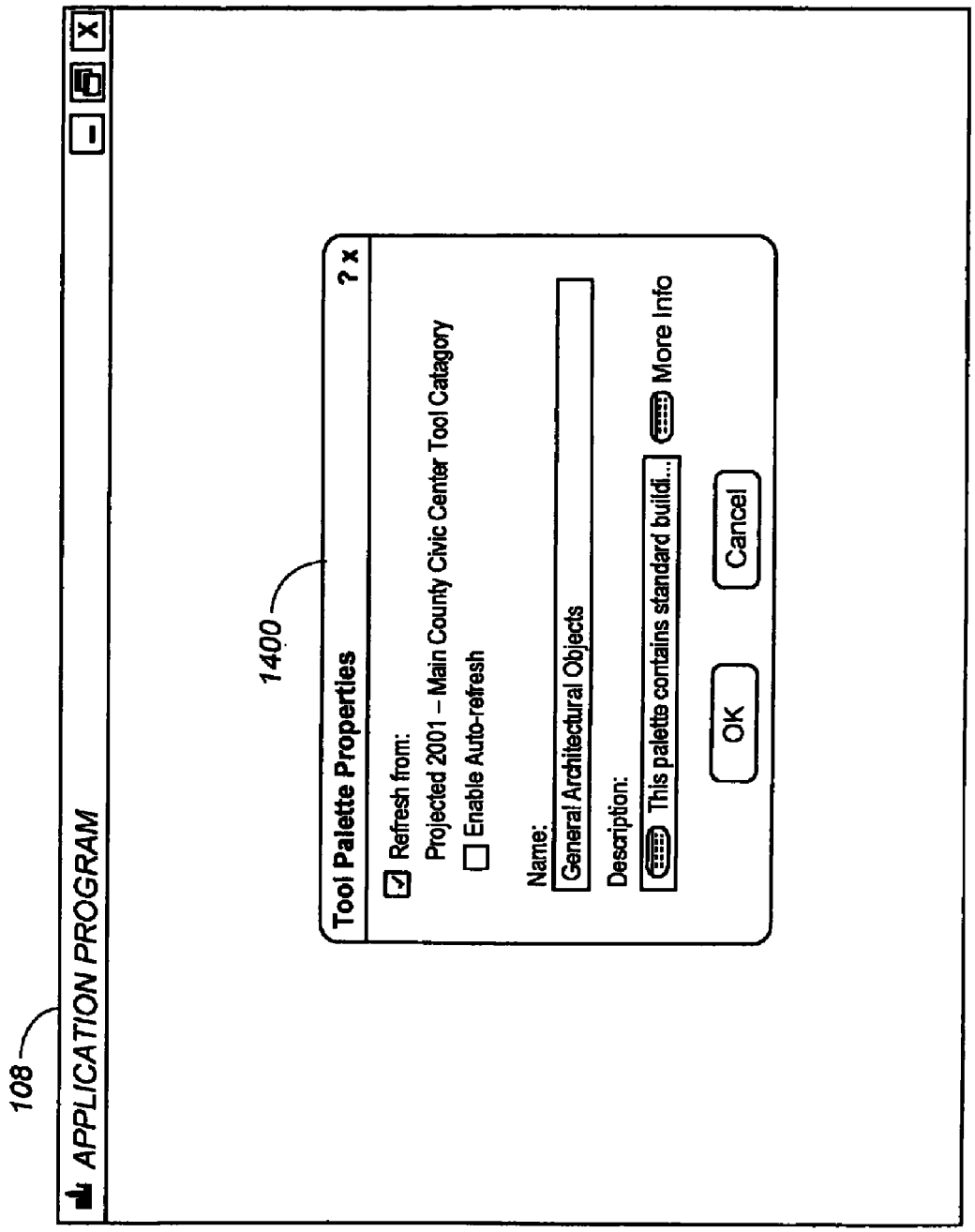
FIG. 14 is an illustration of an application program window and a Palette Properties Worksheet Dialog, according to a preferred embodiment of the present invention.

FIG. 14 is an illustration of the application program 108 window and a Palette Properties Worksheet Dialog 1400 according to the preferred embodiment of the present invention. Palettes have certain properties that are related to their storage in catalogs and collaborative aspects. The following properties are available on the Dialog 1400:

'Refresh from'—When this option is checked, the contents of the palette are immediately refreshed from their source location, which can be on the user's local system, an intranet, or the Internet. Clicking on the catalog name, will hyperlink to the appropriate catalog.

'Enable Auto-refresh'—When this option is checked, the contents of the palette are refreshed when the user loads a Palette Scheme that contains the palette.

'Name and Description'—This option is used to name the palette and give it a description which is displayed when the palette is published in a catalog.

Figure 15:
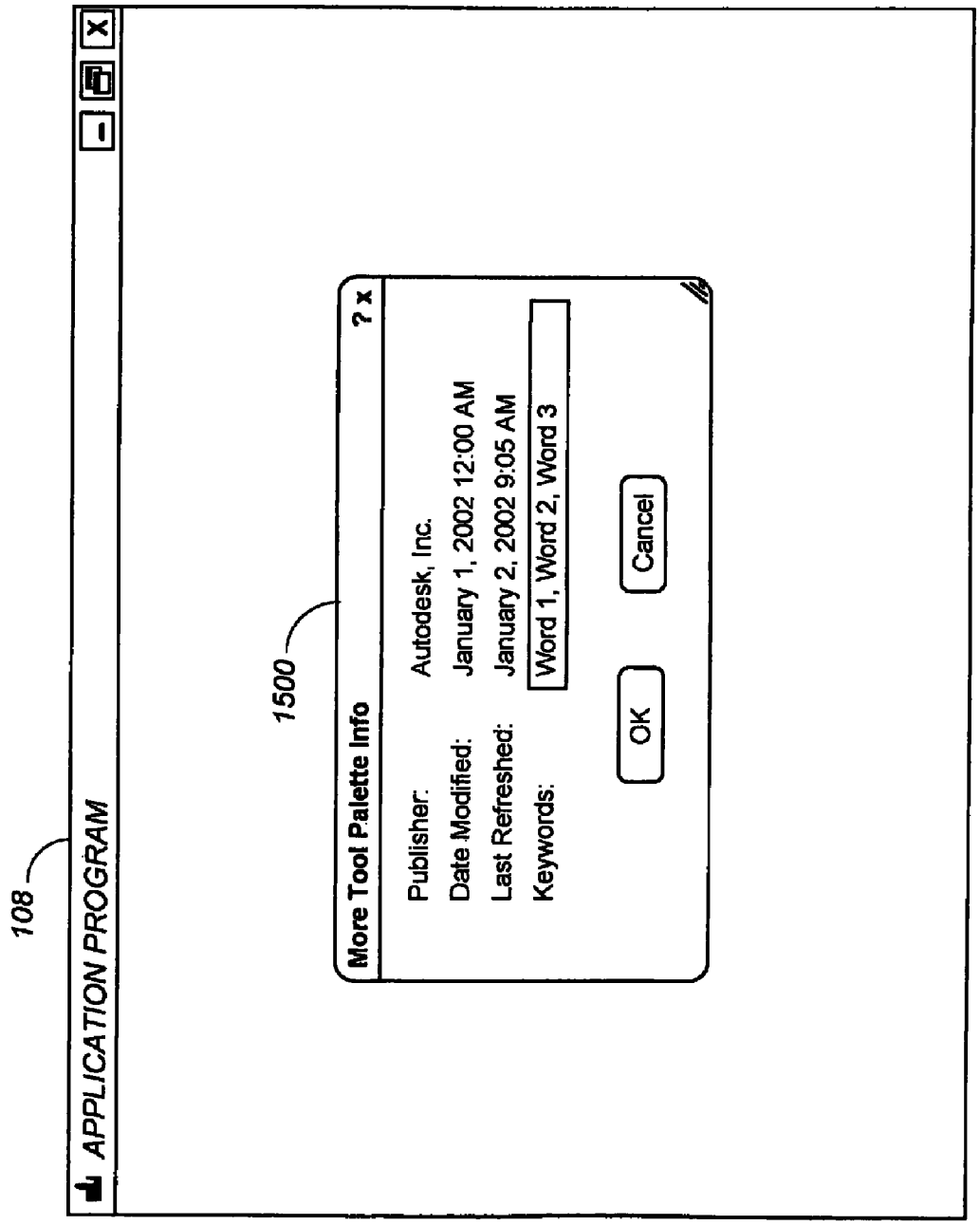
FIG. 15 is an illustration of an application program window and a Palette Properties More Info Worksheet Dialog, according to a preferred embodiment of the present invention.

'More Info'—This option displays extra information about the palette, including publisher, date modified, last refreshed, and the ability to assign keywords that are used to search for the palette from within a catalog. FIG. 15 is an illustration of the application program 108 window and a Palette Properties More Info Worksheet Dialog 1500 according to the preferred embodiment of the present invention.

6.11 Refreshing Palette Contents

As described above, a palette can be refreshed from several locations. This will refresh an XML file definition of the palette, as well as any content contained on the palette.

6.12 Host for Other Features

The basic palette design and behavior is also used for other features. These are two other features that utilize the general palette behavior.

6.12.1 Properties Palette

Figure 16:
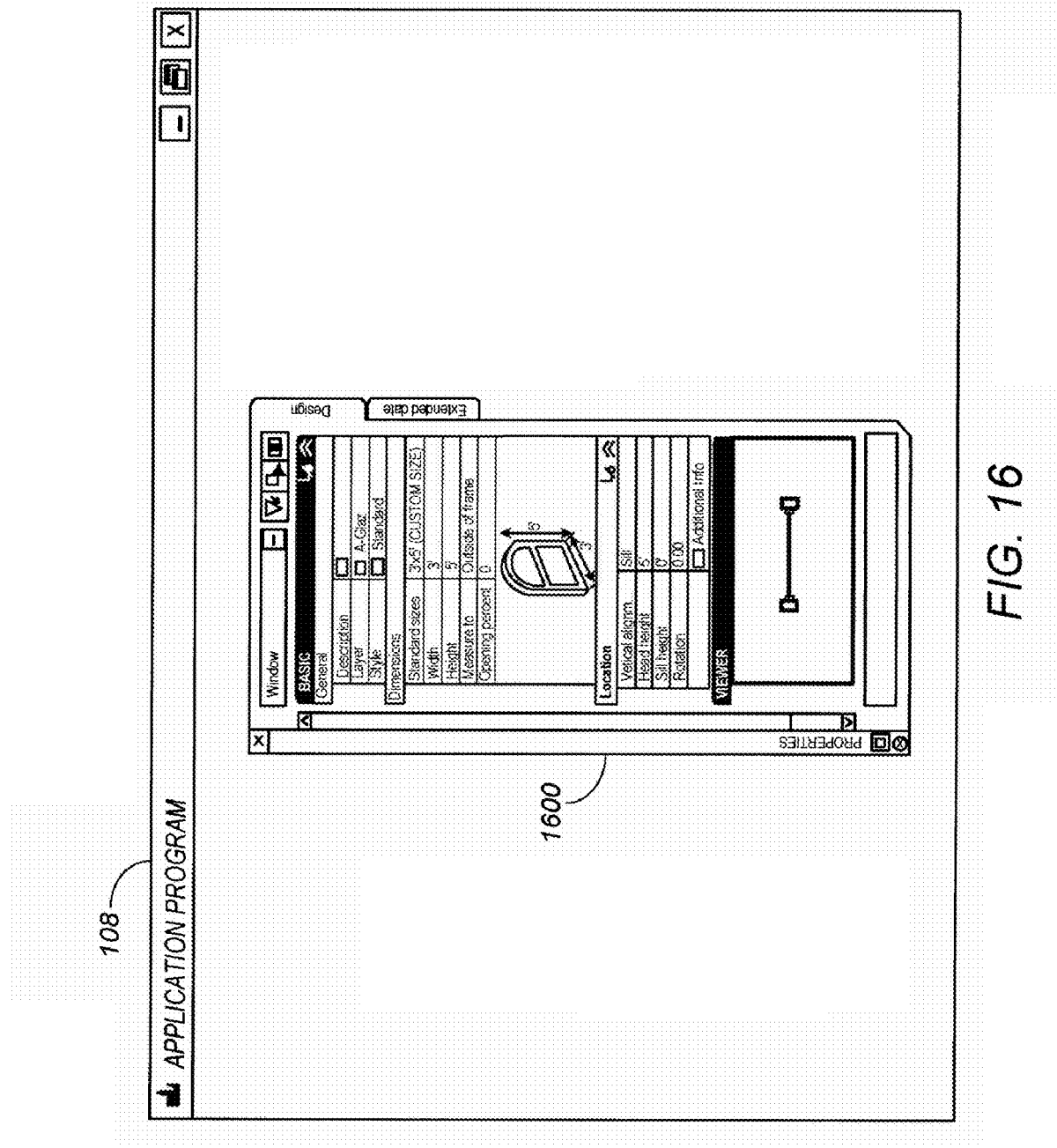
FIG. 16 is an illustration of an application program window and a Properties Palette, according to a preferred embodiment of the present invention.

FIG. 16 is an illustration of the application program 108 window and a Properties Palette 1600 according to the preferred embodiment of the present invention. The Properties Palette set 1600 is provided for an Object Properties Manager (OPM). The Properties Palette set 1600 utilizes the basic 'presentational' qualities of the palettes.

6.12.2 Project Navigation Palette Set

Figure 17:
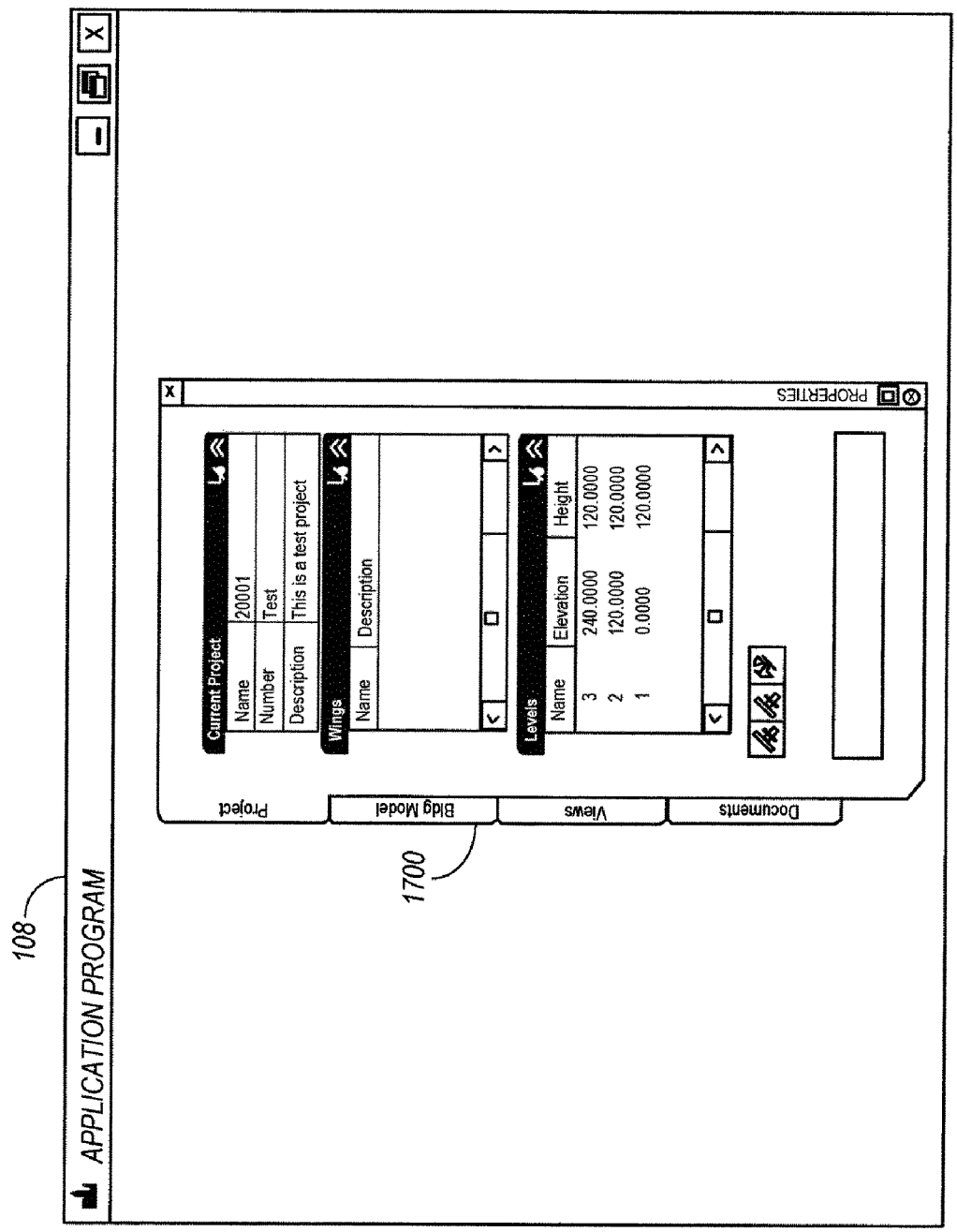
FIG. 17 is an illustration of an application program window and a Project Navigation Palette set, according to the preferred embodiment of the present invention.

FIG. 17 is an illustration of the application program 108 window and a Project Navigation Palette set 1700 according to the preferred embodiment of the present invention. The Project Navigation Palette set 1700 utilizes the basic 'presentational' qualities of the palettes.

7 Logic of the Preferred Embodiment

Figure 18:
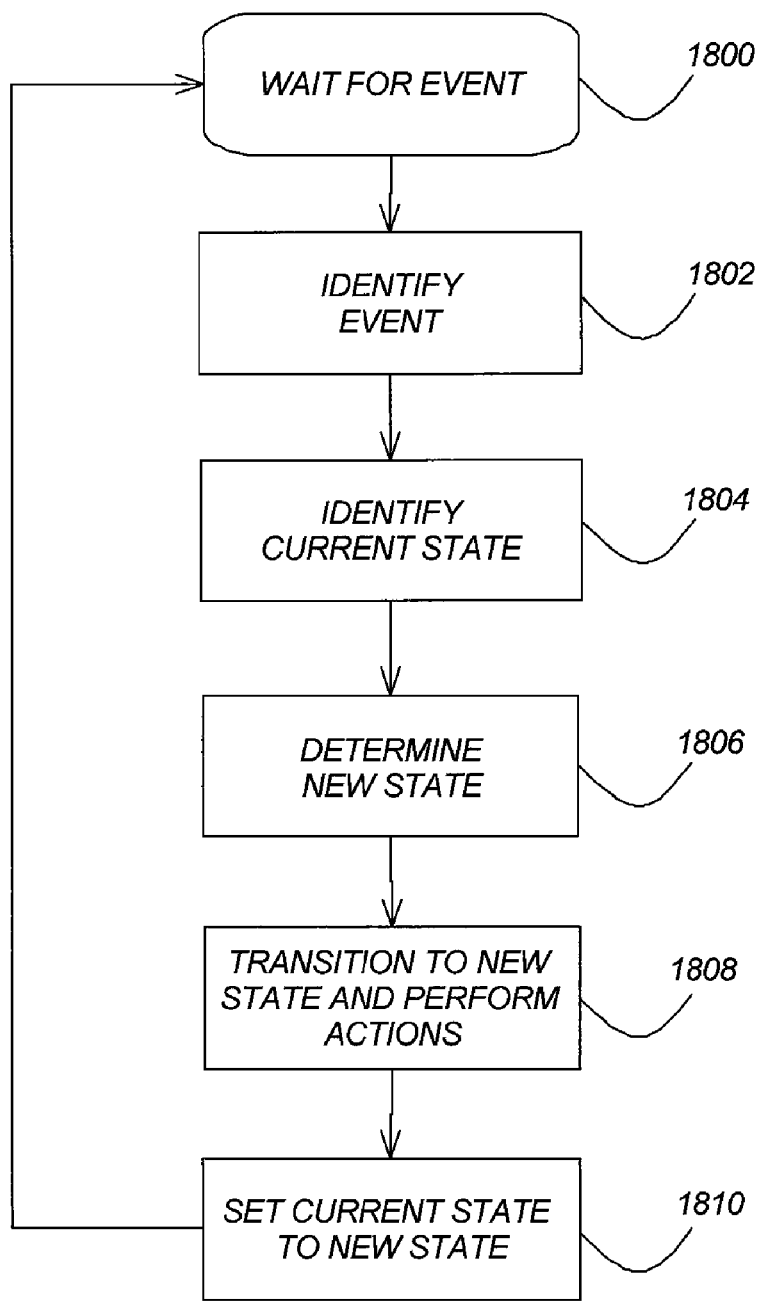
FIG. 18 is a flowchart that illustrates the general logic of a message or event-driven application program performing the steps of the preferred embodiment of the present invention.
Figure 19:
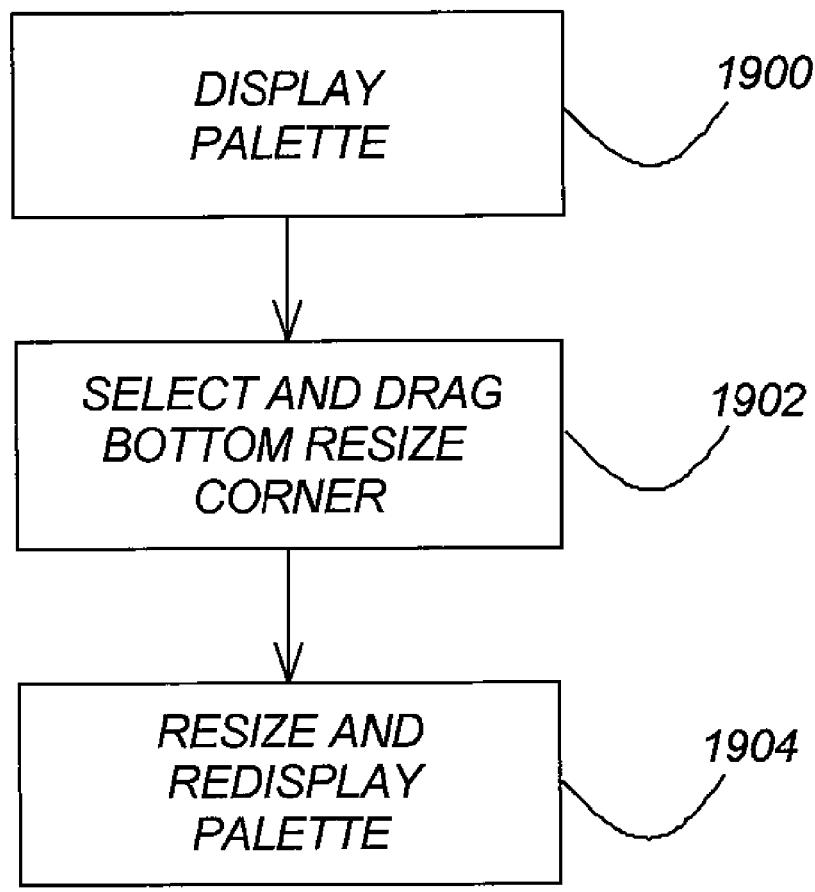
FIG. 19 is a flowchart that illustrates the general logic that is performed in the application program when a palette is resized using the bottom resize corner, according to a preferred embodiment of the present invention.

Flowcharts which illustrate the logic of the application program 108 according to the preferred embodiment of the present invention are shown in FIGS. 18 and 19. Those skilled in the art will recognize that this logic is provided for illustrative purposes only and that different logic may be used to accomplish the same results.

FIG. 18 is a flowchart that illustrates the general logic of a message or event-driven application program 108 performing the steps of the preferred embodiment of the present invention. In such an application program 108, operations are performed when transitions are made, based upon the receipt of messages or events, from present or current states to new states.

Generally, the flowchart begins by waiting at block 1800 for an event (e.g., a mouse button click). It should be appreciated that during this time, other operating system tasks, e.g., file, memory, and video tasks, etc., may also be carried out. When an event occurs, control passes to block 1802 to identify the event. Based upon the event, as well as the current state of the application program 108 determined in block 1804, a new state is determined in block 1806. In block 1808, the logic transitions to the new state and performs any actions required for the transition. In block 1810, the current state is set to the previously determined new state, and control returns to block 1812 to wait for more input events.

The specific operations that are performed by block 1808 when transitioning between states will vary depending upon the current state and the event. The various operations required to implement the application program 108 represent particular events handled by the logic. However, it should be appreciated that these operations represent merely a subset of all of the events handled by the application program 108.

7.1 Non-Rectangular Window

FIG. 19 is a flowchart that illustrates the general logic that is performed in the application program 108 when a palette is resited using the bottom resize corner, according to the preferred embodiment of the present invention.

Block 1900 represents the application program 108 displaying a palette in the graphical user interface 200, wherein the palette includes a bottom resize corner, so that the palette forms a non-rectangular window, and the bottom resize corner is selected and dragged in order to resize the palette. In this embodiment, the bottom resize corner is a chamfered or beveled corner.

Block 1902 represents the application program 108 accepting input from the user selecting and dragging the bottom resize corner in order to resize the palette.

Block 1904 represents the application program 108 resizing and redisplaying the palette.

7.2 Vertical Title Bar

Figure 20:
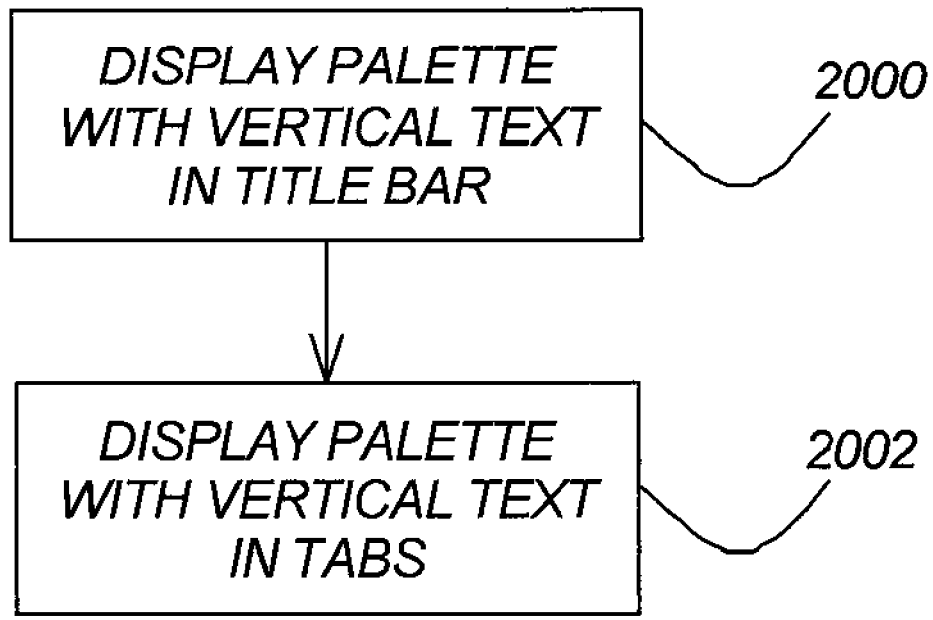
FIG. 20 is a flowchart that illustrates the general logic that is performed in the application program when a palette is displayed with a vertical title bar and vertical tabs, according to a preferred embodiment of the present invention.

FIG. 20 is a flowchart that illustrates the general logic that is performed in the application program 108 when a palette is displayed with a vertical title bar and vertical tabs, according to the preferred embodiment of the present invention.

Block 2000 represents the application program 108 displaying a palette in the graphical user interface 200, wherein the palette includes one or more title bars extending vertically along a side of the palette and text within the title bar extends vertically.

Block 2002 represents the application program 108 displaying a palette in the graphical user interface 200, wherein the palette includes one or more tabs extending vertically along a side of the palette and text within the tab extends vertically.

7.3 Snapping

Figure 21:
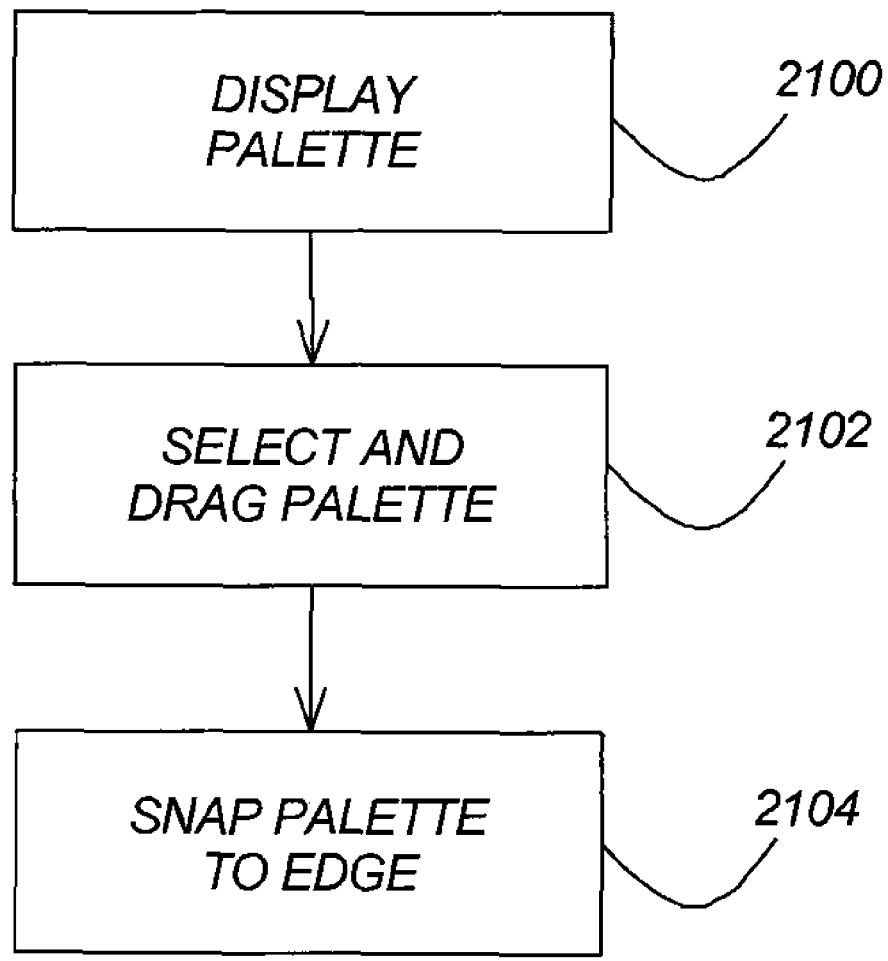
FIG. 21 is a flowchart that illustrates the general logic that is performed in the application program when a palette is brought into proximity with an edge of a window or screen, according to a preferred embodiment of the present invention.

FIG. 21 is a flowchart that illustrates the general logic that is performed in the application program 108 when a palette is brought into proximity with an edge of a window or screen, according to the preferred embodiment of the present invention.

Block 2100 represents the application program 108 displaying a palette in the graphical user interface 200.

Block 2102 represents the application program 108 accepting input from the user selecting and dragging the palette.

Block 2104 represents the application program 108 snapping the palette to an edge of a window or screen when the palette is brought into proximity of the edge. In this embodiment, the palette leaves a buffer space when it snaps to the edge. Moreover, the palette flips when it snaps to the edge, and more specifically, a title bar of the palette flips justification when it snaps to the edge, so that the title bar faces an inward side of the palette.

7.4 Auto-Hide

Figure 22:
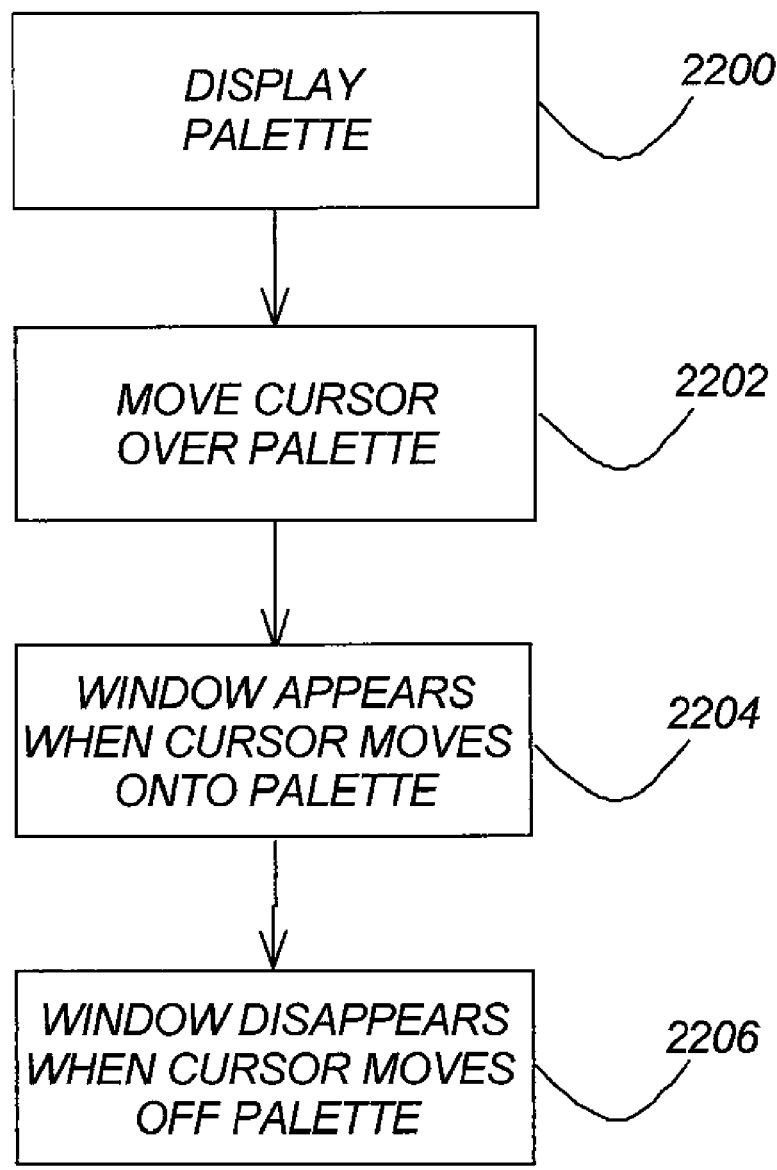
FIG. 22 is a flowchart that illustrates the general logic that is performed in the application program when a palette uses auto-hide functionality, according to a preferred embodiment of the present invention.

FIG. 22 is a flowchart that illustrates the general logic that is performed in the application program 108 when a palette uses auto-hide functionality, according to the preferred embodiment of the present invention.

Block 2200 represents the application program 108 displaying a palette in the graphical user interface 200.

Block 2202 represents the application program 108 accepting input from the user moving the cursor over the palette.

Block 2204 represents the application program 108 using auto-hide functionality that, when enabled, causes the palette's window to appear when a cursor moves onto the palette.

Block 2206 represents the application program 108 using auto-hide functionality that, when enabled, causes the palette's window to disappear when a cursor moves off of the palette, leaving only a title bar of the palette displayed.

In this embodiment, the auto-hide functionality is enabled and disabled by a button on the palette.

7.5 Pan Scrolling

Figure 23:
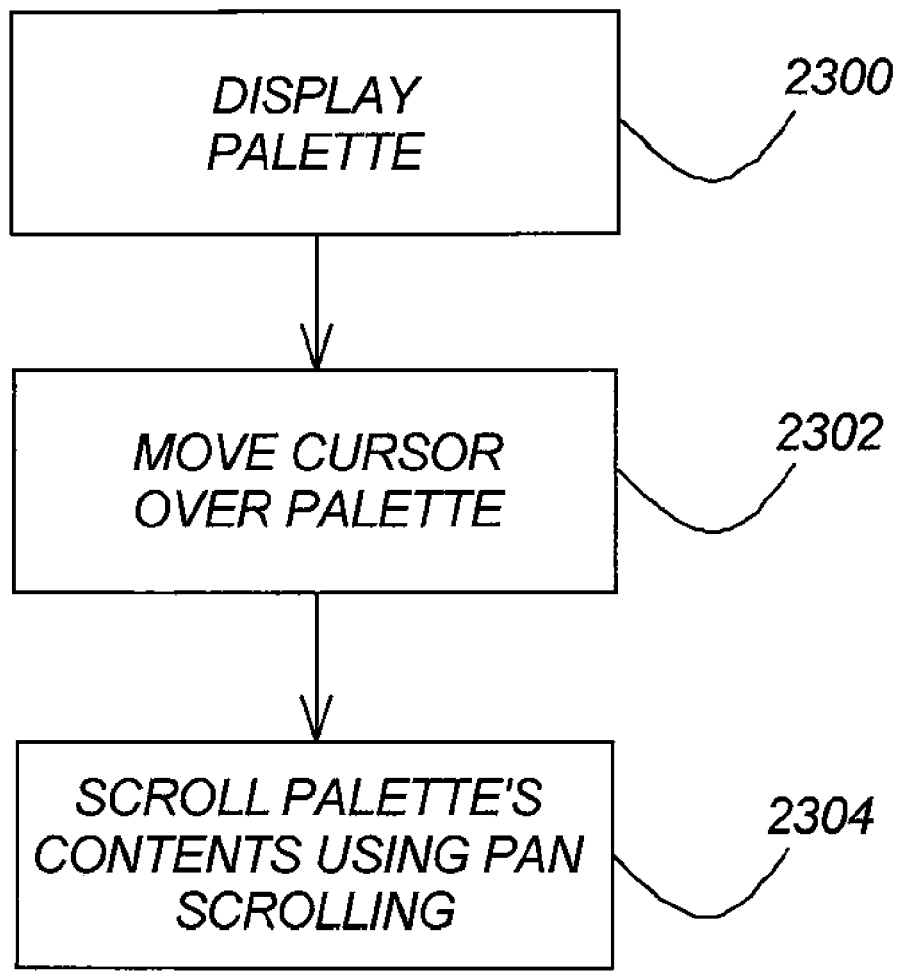
FIG. 23 is a flowchart that illustrates the general logic that is performed in the application program when a palette uses pan scrolling, according to a preferred embodiment of the present invention.

FIG. 23 is a flowchart that illustrates the general logic that is performed in the application program 108 when a palette uses pan scrolling, according to the preferred embodiment of the present invention.

Block 2300 represents the application program 108 displaying a palette in the graphical user interface 200.

Block 2302 represents the application program 108 accepting input from the user moving the cursor over the palette.

Block 2304 represents the application program 108 scrolling the palette's contents using pan scrolling.

7.6 Stacking and Tear-Off

Figure 24:
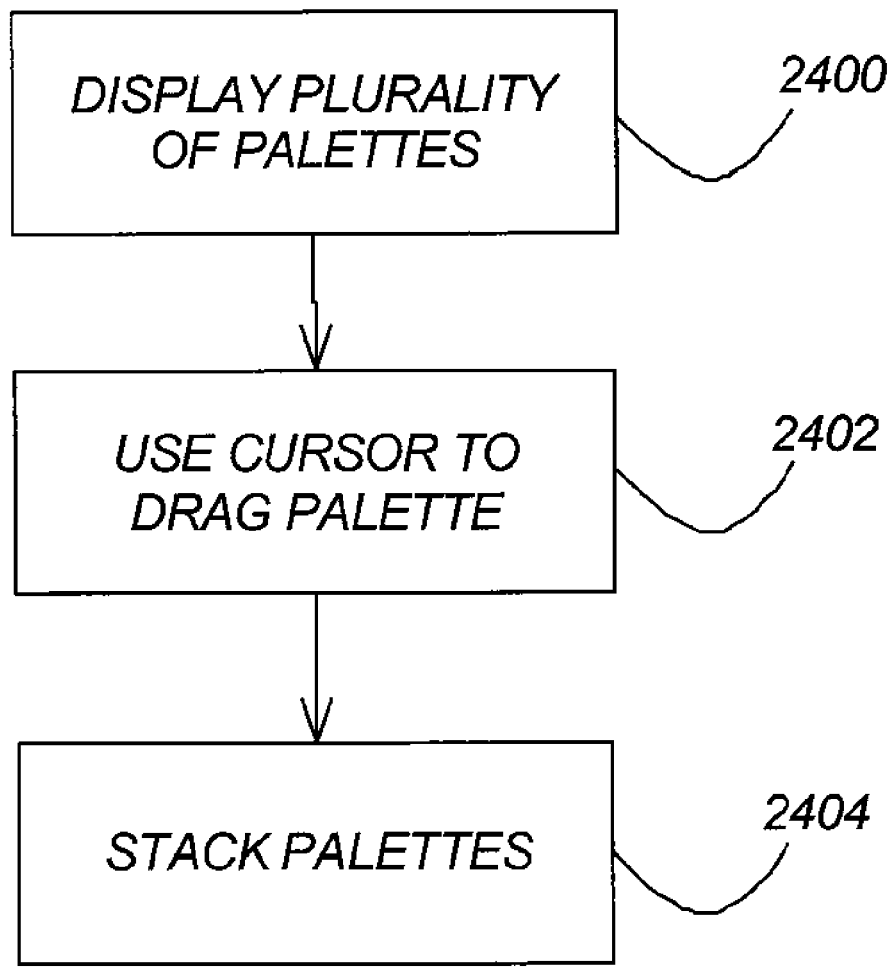
FIG. 24 is a flowchart that illustrates the general logic that is performed in the application program when stacking a plurality of palettes into a palette set, according to a preferred embodiment of the present invention.

FIG. 24 is a flowchart that illustrates the general logic that is performed in the application program 108 when stacking a plurality of palettes into a palette set, according to the preferred embodiment of the present invention.

Block 2400 represents the application program 108 displaying a plurality of palettes in the graphical user interface 200.

Block 2402 represents the application program 108 accepting input from the user selecting and dragging a palette by its title bar or tab.

Block 2404 represents the application program 108 stacking the palette with one or more of the other palettes, when the palette is dragged into proximity with the other palette and then dropped onto the other palette.

7.7 Single Palette Vs. Palette Set

Figure 25:
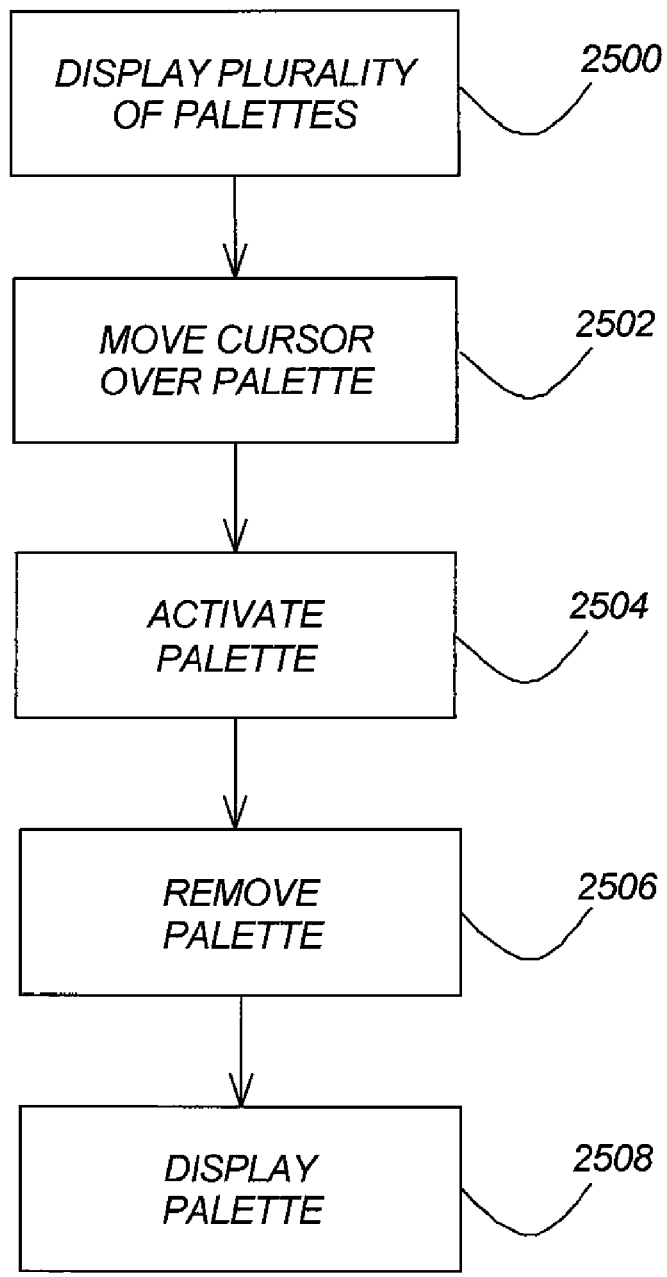
FIG. 25 is a flowchart that illustrates the general logic that is performed in the application program when selecting palettes stacked into a palette set, according to a preferred embodiment of the present invention.

FIG. 25 is a flowchart that illustrates the general logic that is performed in the application program 108 when selecting palettes stacked into a palette set, according to the preferred embodiment of the present invention.

Block 2500 represents the application program 108 displaying a plurality of palettes in the graphical user interface 200, wherein the palettes are arranged in a stack and a title bar of a palette on top of the stack displays a palette set name.

Block 2502 represents the application program 108 accepting input from the user moving the cursor over the palette.

Block 2504 represents the application program 108 activating a specific one of the palettes by selecting a tab of the stack associated with the specific one of the palettes.

Block 2506 represents the application program 108 removing the specific one of the palettes from the stack when the specific one of the palettes is selected and dragged from the stack.

Block 2508 represents the application program 108 displaying the specific palette removed from the stack, wherein the tab is not displayed. Moreover, a title bar of a palette removed from the stack displays a palette name, not the palette set name.

7.8 Stacking Drop Source and Target

Figure 26:
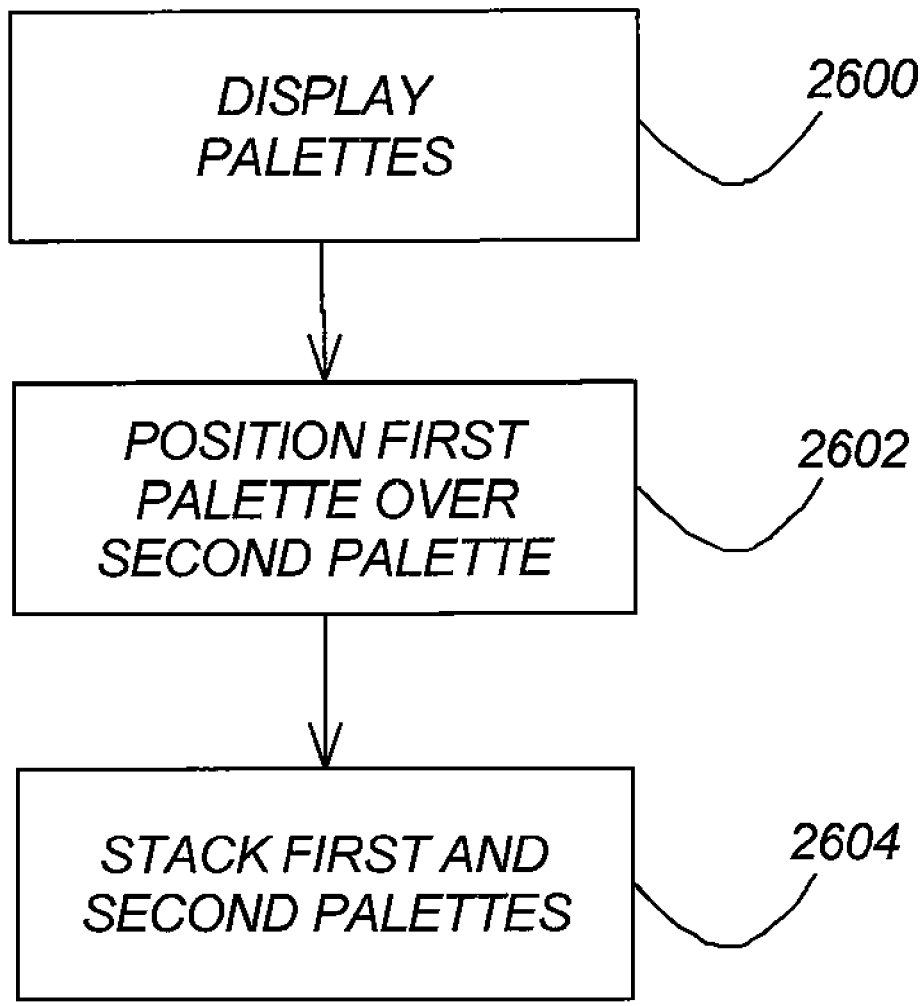
FIG. 26 is a flowchart that illustrates the general logic that is performed in the application program when stacking palettes into a palette set, according to a preferred embodiment of the present invention.

FIG. 26 is a flowchart that illustrates the general logic that is performed in the application program 108 when stacking palettes into a palette set, according to the preferred embodiment of the present invention.

Block 2600 represents the application program 108 displaying a plurality of palettes in the graphical user interface 200.

Block 2602 represents the application program 108 accepting input from the user and positioning a first one of the palettes over a second one of the palettes.

Block 2604 represents the application program 108 stacking the first one of the palettes onto the second one of the palettes, wherein the first one of the palettes assumes a justification and/or auto-hide characteristic of the second one of the palettes.

7.9 XOR Feedback for Overlapping Palettes

Figure 27:
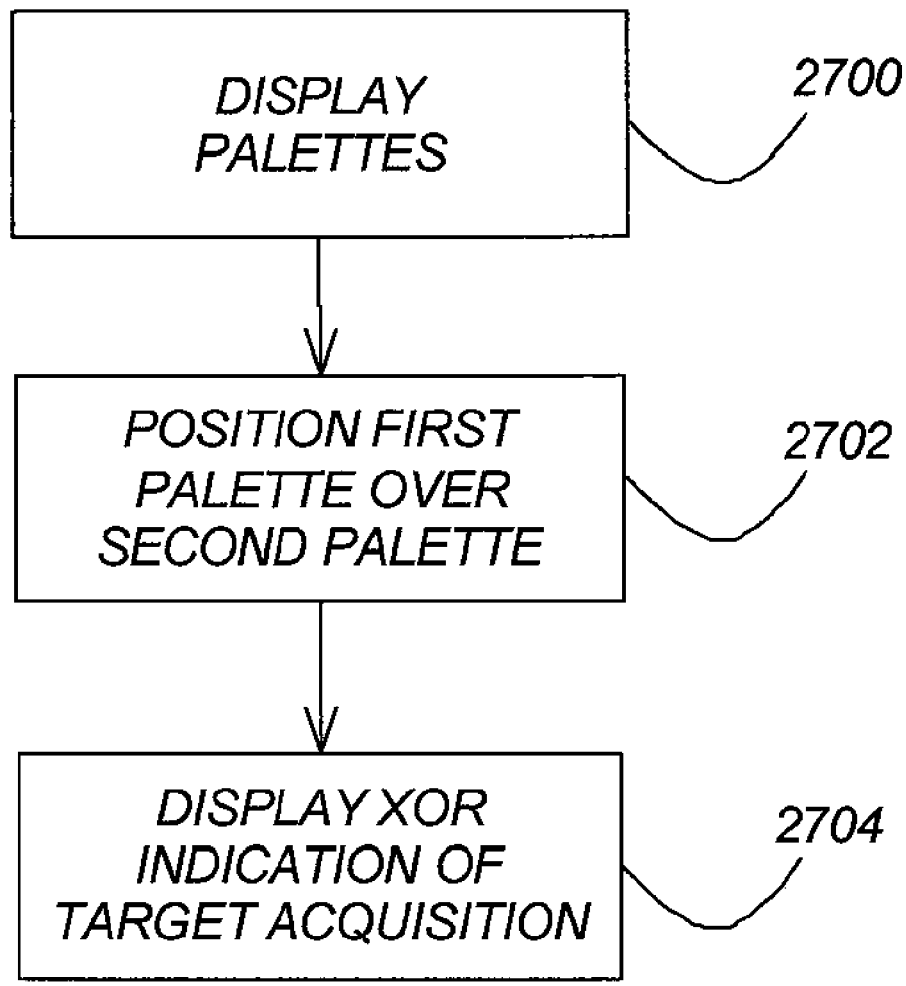
FIG. 27 is a flowchart that illustrates the general logic that is performed in the application program when stacking palettes into a palette set, according to a preferred embodiment of the present invention.

FIG. 27 is a flowchart that illustrates the general logic that is performed in the application program 108 when stacking palettes into a palette set, according to the preferred embodiment of the present invention.

Block 2700 represents the application program 108 displaying a plurality of palettes in the graphical user interface 200.

Block 2702 represents the application program 108 accepting input from the user and positioning a first one of the palettes over a second one of the palettes.

Block 2704 represents the application program 108 displaying an outline of the second one of the palettes using an XOR indication of target acquisition, while the first one of the palettes is positioned over the second one of the palettes, in order to indicate that the first one of the palettes may be stacked onto the second one of the palettes. The XOR indication of target acquisition comprises an outline of the second palette, lying immediately outside a border line of the second palette, and following a contour of the second palette, including any tabs.

7.10 Stacking and Tear-Off Restriction

Figure 28:
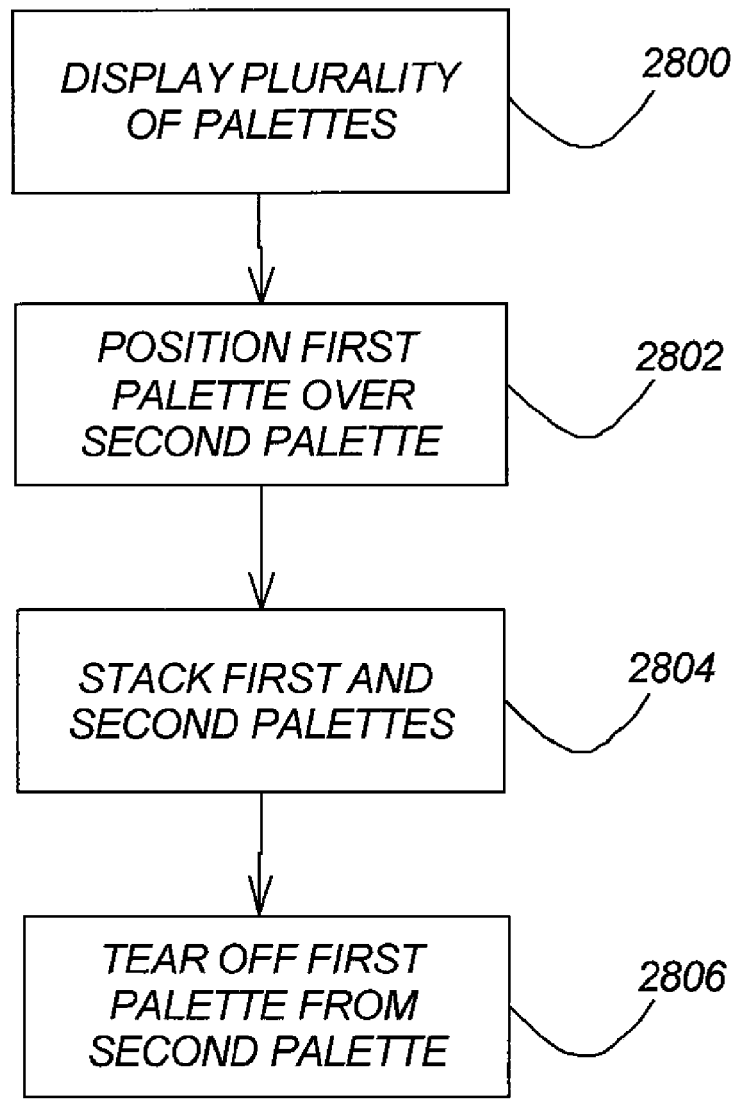
FIG. 28 is a flowchart that illustrates the general logic that is performed in the application program when stacking palettes into a palette set and tearing off palettes from a palette set, according to a preferred embodiment of the present invention.

FIG. 28 is a flowchart that illustrates the general logic that is performed in the application program 108 when stacking palettes into a palette set and tearing off palettes from a palette set, according to the preferred embodiment of the present invention.

Block 2800 represents the application program 108 displaying a plurality of palettes in the graphical user interface 200.

Block 2802 represents the application program 108 accepting input from the user and positioning a first one of the palettes over a second one of the palettes.

Block 2804 represents the application program 108 stacking the first one of the palettes onto the second one of the palettes, wherein one or more of the palettes are flagged to restrict stacking to only certain other ones of the palettes.

Block 2806 represents the application program 108 tearing off the first one of the palettes from the second one of the palettes, wherein one or more of the palettes are flagged to restrict tearing the palettes apart when the palettes are stacked.

7.11 Tab Overflow

Figure 29:
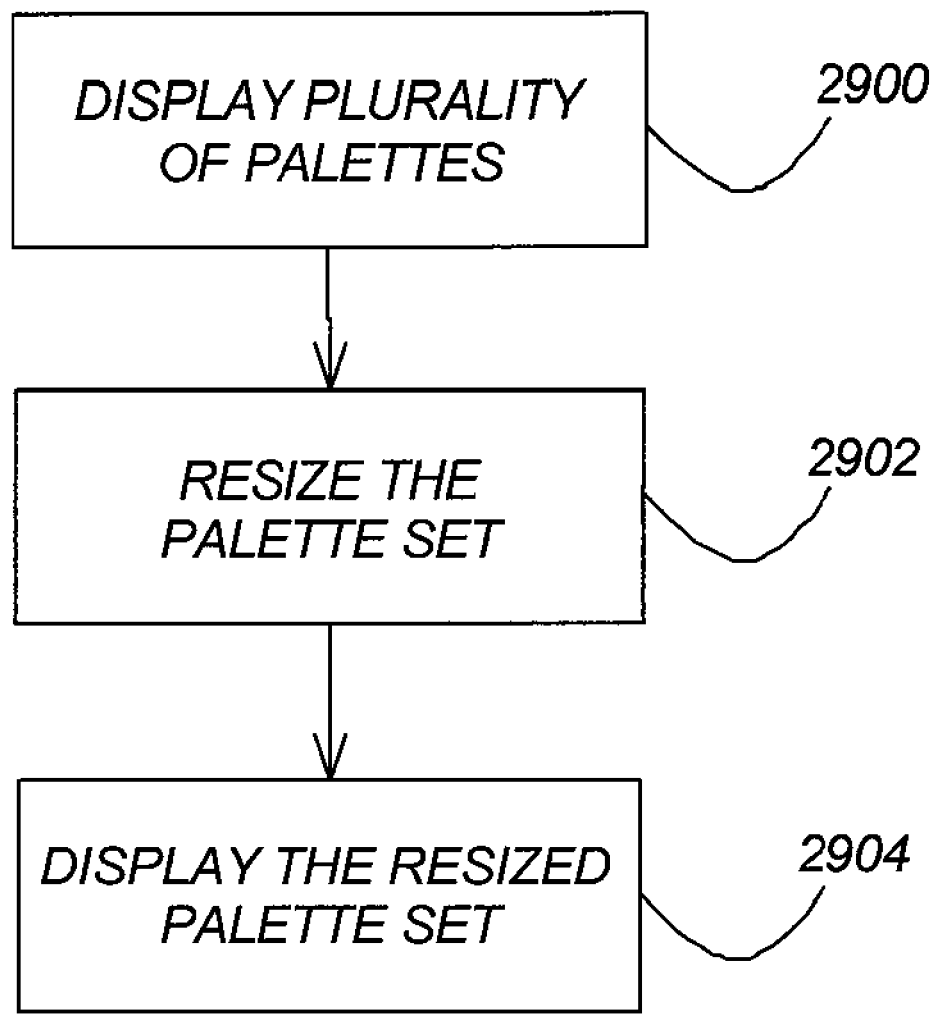
FIG. 29 is a flowchart that illustrates the general logic that is performed in the application program when selecting palettes stacked into a palette set, according to a preferred embodiment of the present invention.

FIG. 29 is a flowchart that illustrates the general logic that is performed in the application program 108 when selecting palettes stacked into a palette set, according to the preferred embodiment of the present invention.

Block 2900 represents the application program 108 displaying a plurality of palettes in the graphical user interface 200, wherein the palettes are stacked in a palette set, and each of the palettes is associated with one of a plurality of tabs displayed on the stack.

Block 2902 represents the application program 108 accepting input from the user using a cursor to resize the palette set.

Block 2904 represents the application program 108 displaying the resized palette set, wherein the tabs are proportionally resized when the palette set is resized. Further, this block represents the application program 108 overflowing one or more of the tabs when a minimum size is reached, wherein the overflowed tabs are contained on a flyout menu, the flyout menu shows all of the tabs in the stack, exposed palettes in the stack are above a separator line in the flyout menu, and hidden palettes in the palette set are below the separator line in the flyout menu.

7.12 Title Bar and Tab Text Eliding

Figure 30:
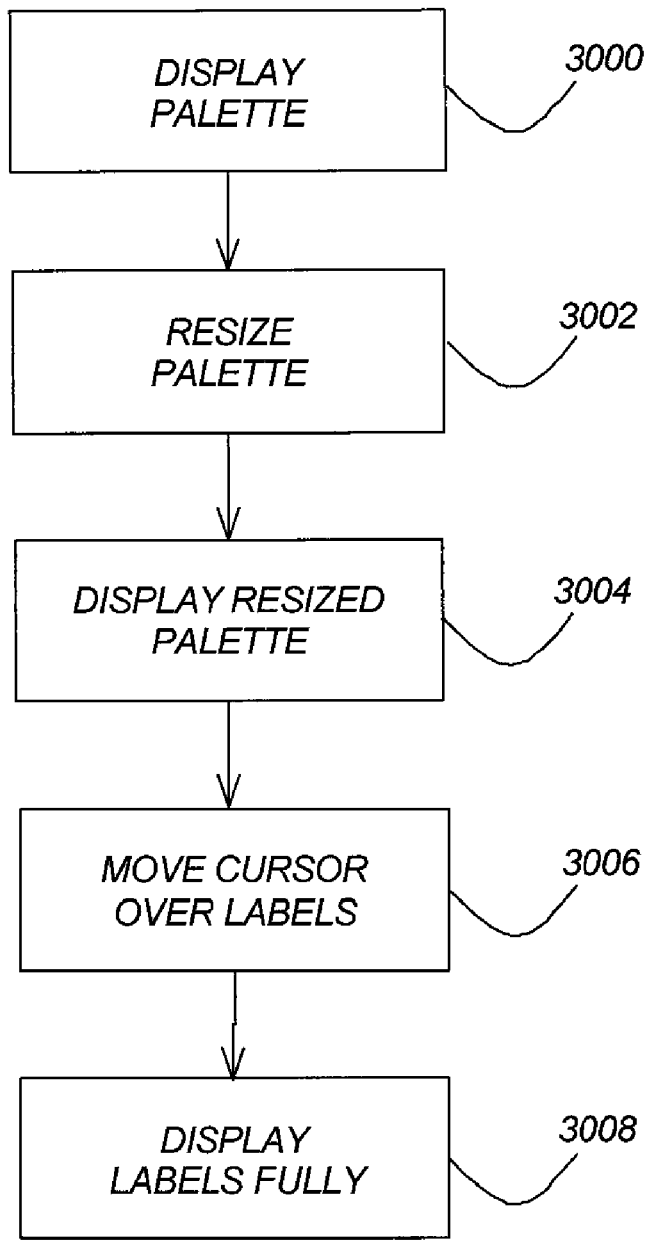
FIG. 30 is a flowchart that illustrates the general logic that is performed in the application program when displaying text labels for palette, according to a preferred embodiment of the present invention.

FIG. 30 is a flowchart that illustrates the general logic that is performed in the application program 108 when displaying text labels for palette, according to the preferred embodiment of the present invention.

Block 3000 represents the application program 108 displaying a palette in the graphical user interface 200, wherein the palette includes one or more text labels, such as title bar text labels and tab text labels.

Block 3002 represents the application program 108 accepting input from the user using a cursor to resize the palette.

Block 3004 represents the application program 108 displaying the resized palette, wherein the text labels elide when the text labels do not fit within an available space.

Block 3006 represents the application program 108 accepting input from the user positioning a cursor so that it hovers over the elided text labels.

Block 3008 represents the application program 108 displaying the text labels fully, when the cursor hovers over the elided text labels.

7.13 Saving Palettes in Schemes

Figure 31:
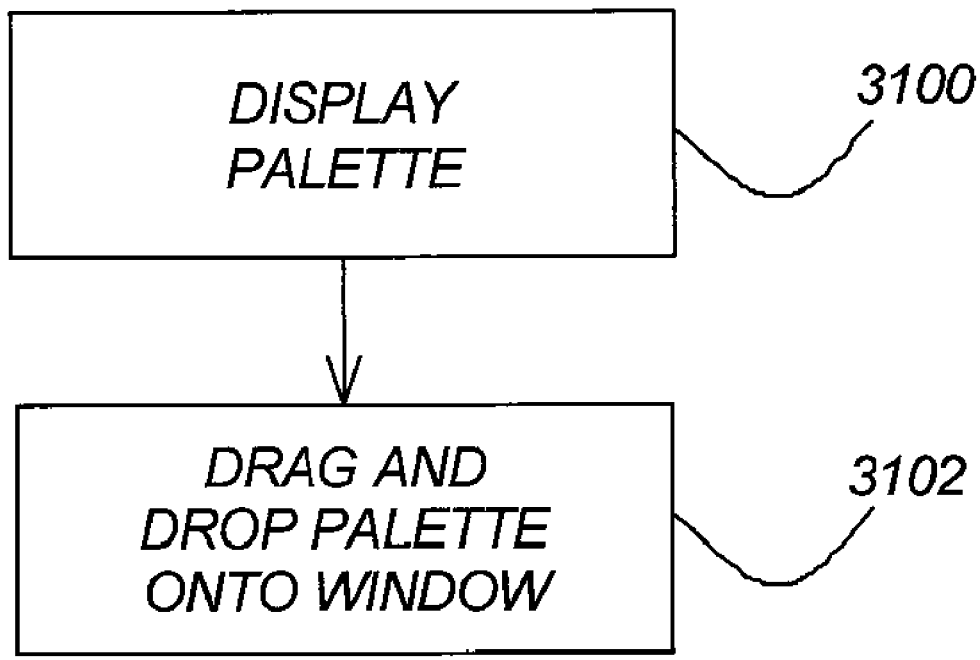
FIG. 31 is a flowchart that illustrates the general logic that is performed in the application program when displaying palette schemes, according to a preferred embodiment of the present invention.

FIG. 31 is a flowchart that illustrates the general logic that is performed in the application program 108 when displaying palette schemes, according to the preferred embodiment of the present invention.

Block 3100 represents the application program 108 displaying one or more palettes in the graphical user interface 200, wherein a palette scheme defines a collection of the palettes and their state in the graphical user interface, and the state comprises one or more characteristics selected from a group comprising: a screen location, a size, a transparency level, a justification, an auto-hide state, a visibility, a currently selected palette, a currently selected tab, an icon size and an icon arrangement.

Block 3102 represents the application program 108 accepting input from the user using a cursor to drag and drop a palette from a catalog, Internet web site, or File Explorer onto the graphical user interface of the application program 108 window, and thus onto a palette scheme, in order to add the palette to the palette scheme.

7.14 Integration with a Catalog

Figure 32:
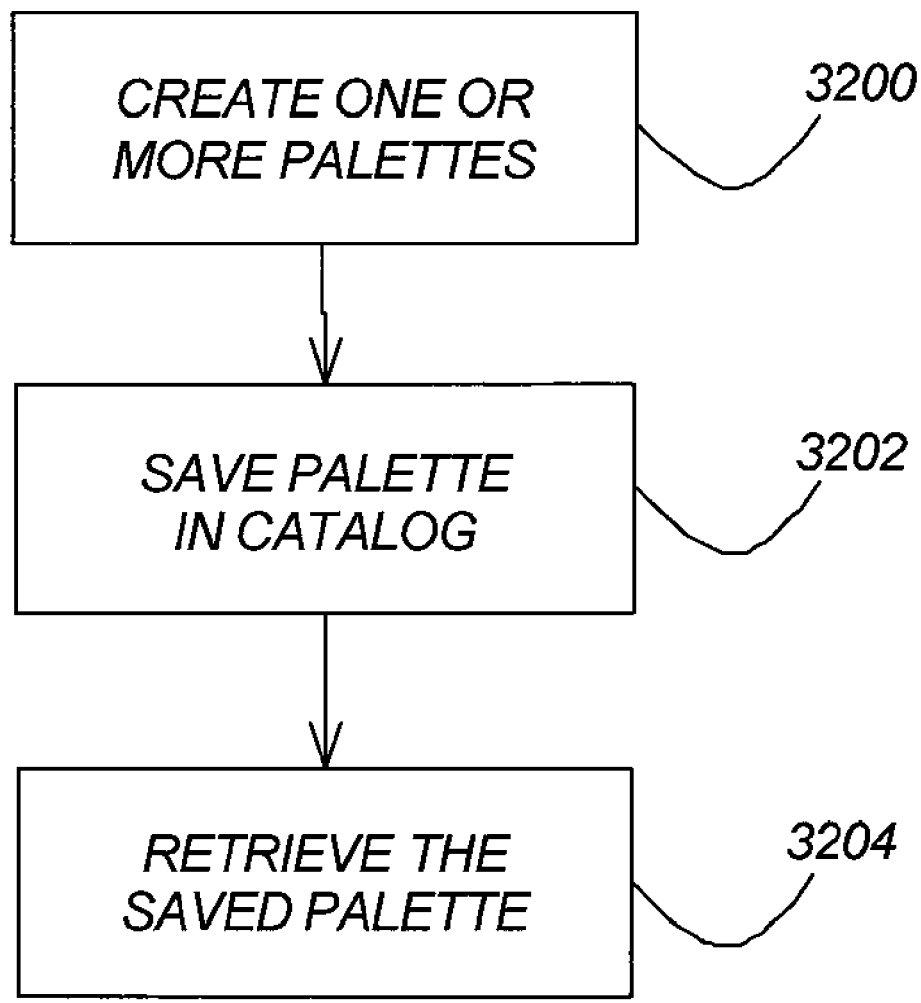
FIG. 32 is a flowchart that illustrates the general logic that is performed in the application program when creating palettes and adding them to catalogs, according to a preferred embodiment of the present invention.

FIG. 32 is a flowchart that illustrates the general logic that is performed in the application program 108 when creating palettes and adding them to catalogs, according to the preferred embodiment of the present invention.

Block 3200 represents the application program 108 creating one or more palettes in the graphical user interface 200.

Block 3202 represents the application program 108 saving the created palette in a catalog, so that the saved palette is available for sharing.

Block 3204 represents the application program 108 retrieving the saved palette from the catalog into the graphical user interface.

7.15 Palettes are a Drop Source for Content

Figure 33:
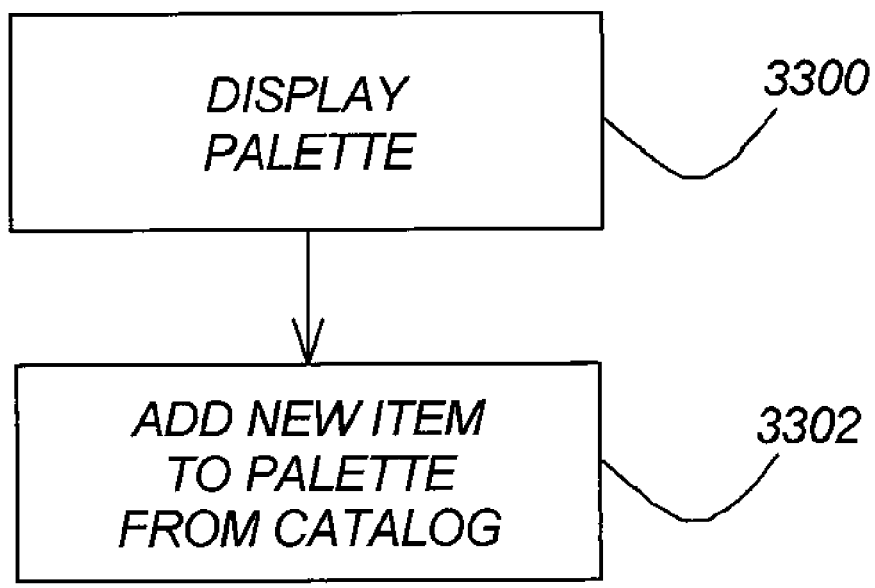
FIG. 33 is a flowchart that illustrates the general logic that is performed in the application program when adding content items to palettes from a catalog, according to a preferred embodiment of the present invention.

FIG. 33 is a flowchart that illustrates the general logic that is performed in the application program 108 when adding objects to palettes, according to the preferred embodiment of the present invention.

Block 3300 represents the application program 108 displaying a palette in the graphical user interface 200, wherein the palette includes zero or more existing content items.

Block 3302 represents the application program 108 adding a new object to the displayed palette by dragging an object from the graphical user interface of the application program 108 window, or an Internet web page, or a catalog, and dropping the dragged object onto the palette.

7.16 Palette Properties

Figure 34:
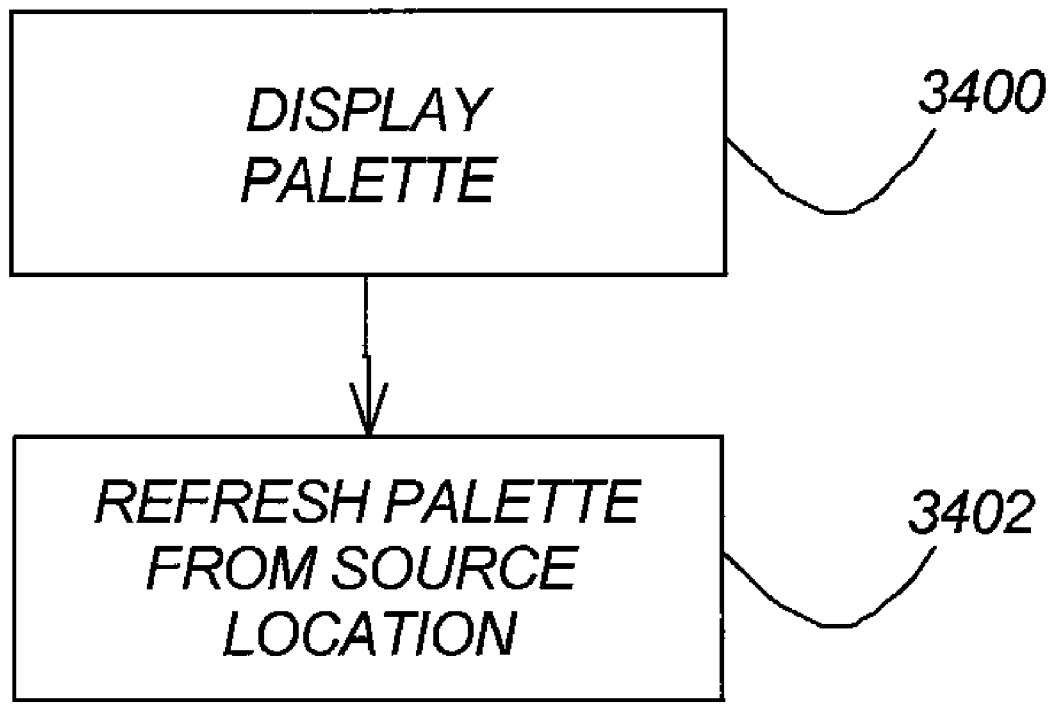
FIG. 34 is a flowchart that illustrates the general logic that is performed in the application program when using palette properties, according to a preferred embodiment of the present invention.

FIG. 34 is a flowchart that illustrates the general logic that is performed in the application program 108 when using palette properties, according to the preferred embodiment of the present invention.

Block 3400 represents the application program 108 displaying a palette in the graphical user interface 200, wherein the palette includes a "refresh from" property that indicates that the palette's contents are refreshed from a source location, wherein the source location comprises a catalog located on a local system, intranet, or Internet. Note also that the palette displays the catalog's name and the catalog's name hyperlinks to the catalog's location.

Block 3402 represents the application program 108 refreshing the palette from the source location.

Figure 35:
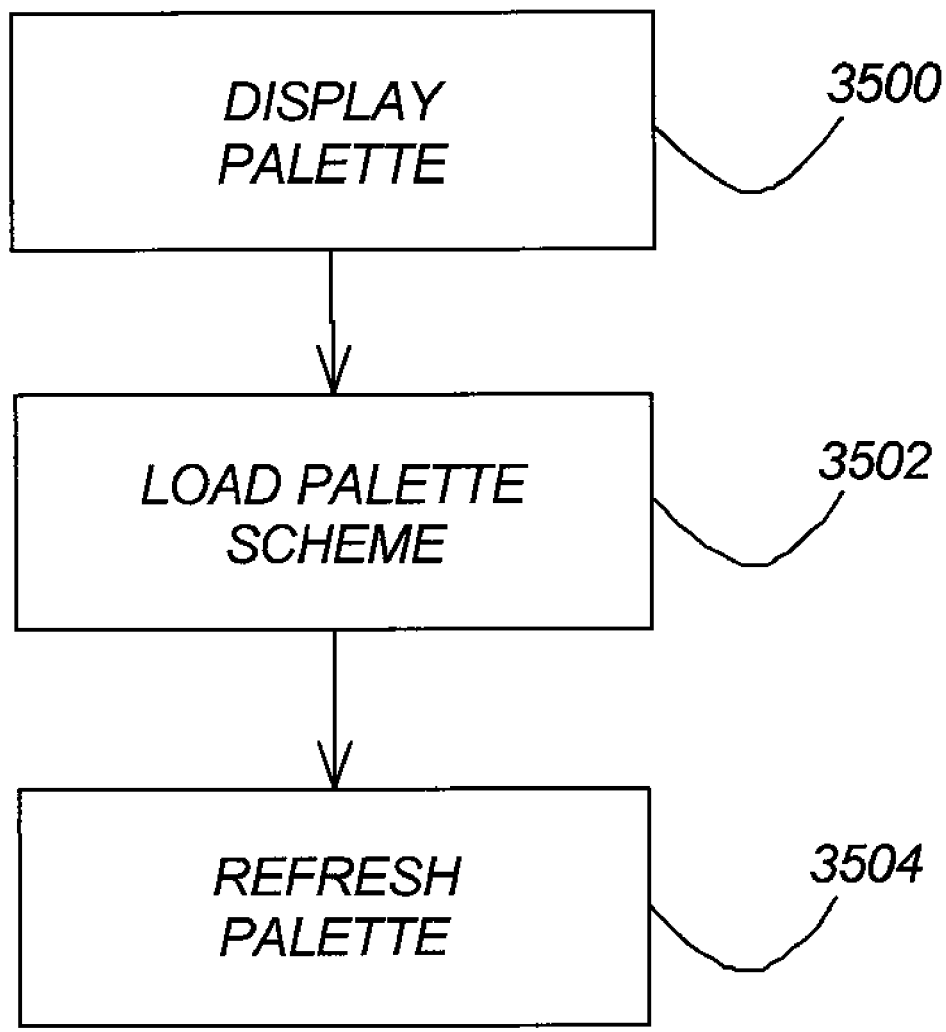
FIG. 35 is a flowchart that illustrates the general logic that is performed in the application program when using palette properties, according to a preferred embodiment of the present invention.

FIG. 35 is a flowchart that illustrates the general logic that is performed in the application program 108 when using palette properties, according to the preferred embodiment of the present invention.

Block 3500 represents the application program 108 displaying a palette in the graphical user interface 200, wherein the palette includes an "auto-refresh" property that indicates that the palette's contents are refreshed when a palette scheme containing the palette is loaded.

Block 3502 represents the application program 108 loading the palette scheme.

Block 3504 represents the application program 108 refreshing the palette according to the palette scheme.

Figure 36:
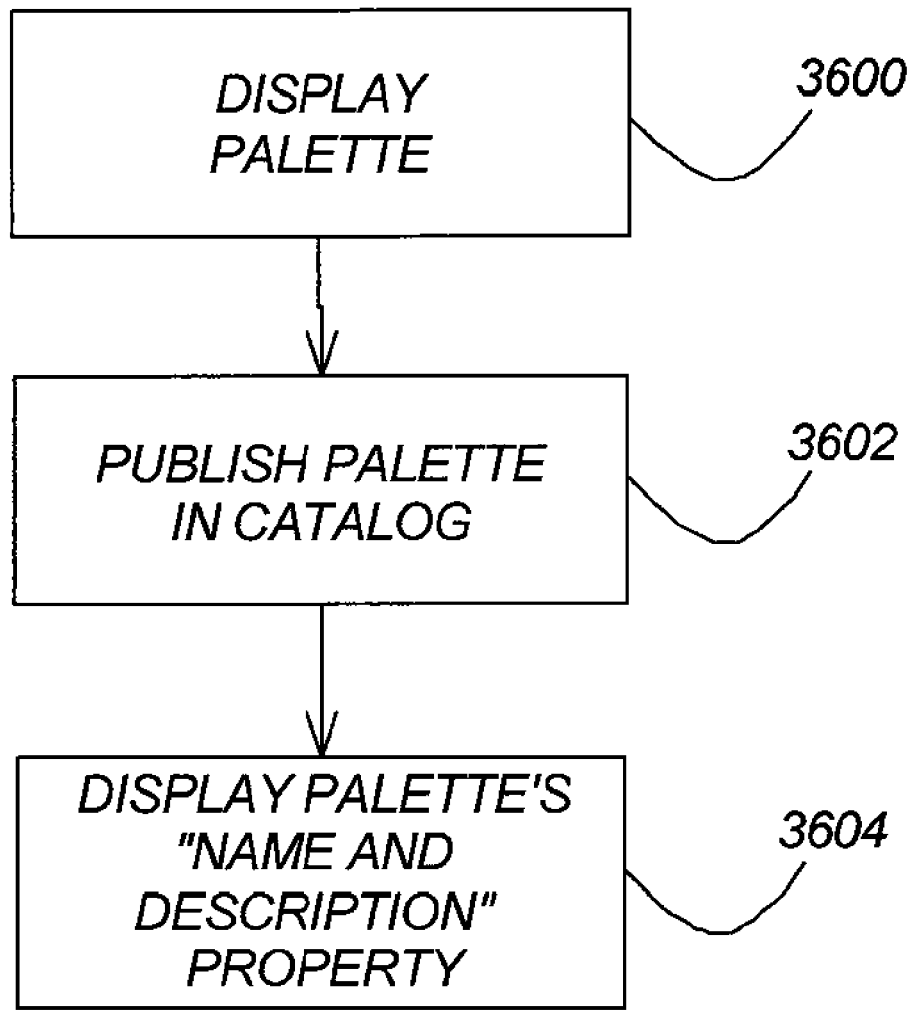
FIG. 36 is a flowchart that illustrates the general logic that is performed in the application program when using palette properties, according to a preferred embodiment of the present invention.

FIG. 36 is a flowchart that illustrates the general logic that is performed in the application program 108 when using palette properties, according to the preferred embodiment of the present invention.

Block 3600 represents the application program 108 displaying a palette in the graphical user interface 200, wherein the palette includes a "name and description" property that is displayed when the palette is published in a catalog.

Block 3602 represents the application program 108 publishing the palette in a catalog.

Block 3604 represents the application program 108 displaying the "name and description" property for the palette.

Figure 37:
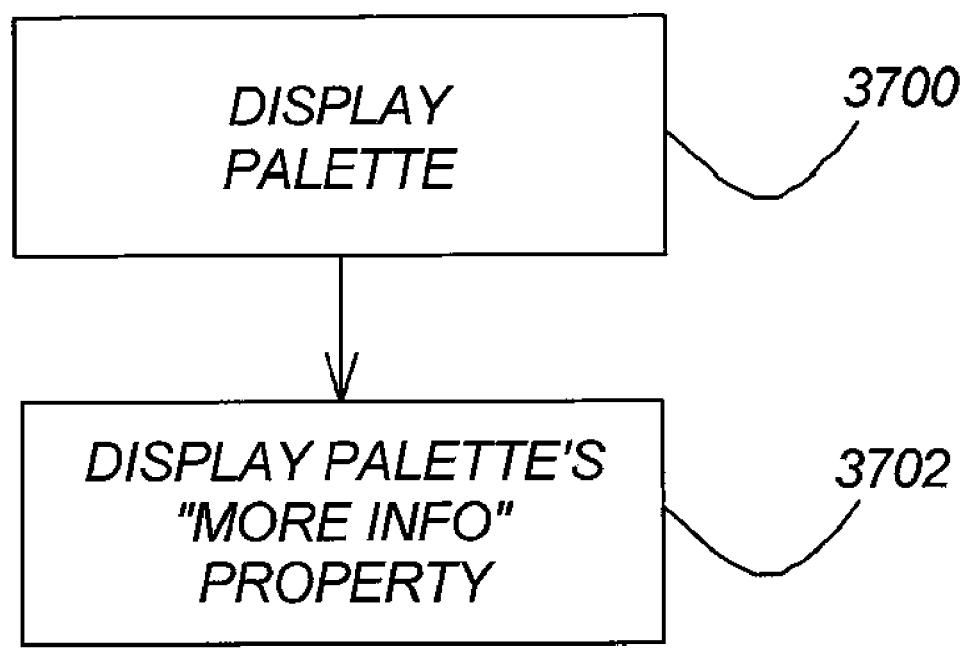
FIG. 37 is a flowchart that illustrates the general logic that is performed in the application program when using palette properties, according to a preferred embodiment of the present invention.

FIG. 37 is a flowchart that illustrates the general logic that is performed in the application program 108 when using palette properties, according to the preferred embodiment of the present invention.

Block 3700 represents the application program 108 displaying a palette in the graphical user interface 200, wherein the palette includes a "more info" property that displays information about the palette, wherein the information is selected from a group comprising a publisher, date modified, last refreshed, and an ability to assign keywords.

Block 3702 represents the application program 108 displaying the "more info" property for the palette.

8 Conclusion

This concludes the description of the preferred embodiment of the invention. The following describes some alternative embodiments for accomplishing the present invention.

For example, any type of computer could be used with the present invention. Moreover, any type of software could benefit from the present invention. Further, various visual representations could be used in place of those found in the preferred embodiment without departing from the scope of the present invention. Finally, different sequences of steps, commands or gestures could be used in place of those found in the preferred embodiment without departing from the scope of the present invention.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for operating a graphical user interface (GUI) in a computer, comprising:

displaying a first stack of palettes and a second stack of palettes in the GUI, the first stack of palettes and the second stack of palettes each including a plurality of tabbed palettes and a title bar, each tabbed palette including a tab, and the second stack of palettes being in an auto-hidden state;

receiving first user input in the GUI to grab the title bar of the first stack of palettes and to drag the first stack of palettes into proximity with the second stack of palettes;

in response to receiving the first user input, rolling out the second stack of palettes and displaying an XOR outline around the second stack of palettes indicating that the second stack of palettes is an eligible drop target;

receiving second user input to drop the dragged first stack of palettes onto the second stack of palettes to create a combined stack of palettes; and in response to receiving the second user input, displaying a combined stack of palettes comprising the tabbed palettes from both the first stack and the second stack of palettes, the combined stack taking on one or more characteristics of the second stack of palettes, and the one or more characteristics including size, justification and auto-hide state of the second stack of palettes.

2. The method of claim 1 wherein the title bar is vertically oriented.

3. The method of claim 1 wherein the XOR outline is an outline lying outside a border line of the second stack of palettes, following an entire contour of the second stack of palettes, including any tabs.

4. The method of claim 1 wherein the tabs of the palettes in the combined stack are resized to accommodate all palettes in the combined stack.

5. A computer-readable medium having instructions stored thereon, which, when executed by at least one processor, cause the processor to perform operations comprising:
   displaying a first stack of palettes and a second stack of palettes in the GUI, the first stack of palettes and the second stack of palettes each including a plurality of tabbed palettes and a title bar, each tabbed palette including a tab, and the second stack of palettes being in an auto-hidden state;
   receiving first user input in the GUI to grab the title bar of the first stack of palettes and to drag the first stack of palettes into proximity with the second stack of palettes;
   in response to receiving the first user input, rolling out the second stack of palettes and displaying an XOR outline around the second stack of palettes indicating that the second stack of palettes is an eligible drop target;
   receiving second user input to drop the dragged first stack of palettes onto the second stack of palettes to create a combined stack of palettes; and
   in response to receiving the second user input, displaying a combined stack of palettes comprising the tabbed palettes from both the first stack and the second stack of palettes, the combined stack taking on one or more characteristics of the second stack of palettes, and the one or more characteristics including size, justification and auto-hide state of the second stack of palettes.

6. The computer-readable medium of claim 5 wherein the title bar is vertically oriented.

7. The computer-readable medium of claim 5 wherein the XOR outline is an outline lying outside a border line of the second stack of palettes, following an entire contour of the second stack of palettes, including any tabs.

8. The computer-readable medium of claim 5 wherein the tabs of the palettes in the combined stack are resized to accommodate all palettes in the combined stack.

9. A system comprising:
   one or more processors;
   memory coupled to the one or more processors and operable for storing instructions, which, when executed by the one or more processors, causes the one or more processors to perform operations, comprising:
      displaying a first stack of palettes and a second stack of palettes in the GUI, the first stack of palettes and the second stack of palettes each including a plurality of tabbed palettes and a title bar, each tabbed palette including a tab, and the second stack of palettes being in an auto-hidden state;
      receiving first user input in the GUI to grab the title bar of the first stack of palettes and to drag the first stack of palettes into proximity with the second stack of palettes;
      in response to receiving the first user input, rolling out the second stack of palettes and displaying an XOR outline around the second stack of palettes indicating that the second stack of palettes is an eligible drop target;
      receiving second user input to drop the dragged first stack of palettes onto the second stack of palettes to create a combined stack of palettes; and
   in response to receiving the second user input, displaying a combined stack of palettes comprising the tabbed palettes from both the first stack and the second stack of palettes, the combined stack taking on one or more characteristics of the second stack of palettes, and the one or more characteristics including size, justification and auto-hide state of the second stack of palettes.

10. The system of claim 9 wherein the title bar is vertically oriented.

11. The system of claim 9 wherein the XOR outline is an outline lying outside a border line of the second stack of palettes, following an entire contour of the second stack of palettes, including any tabs.

12. The system of claim 9 wherein the tabs of the palettes in the combined stack are resized to accommodate all palettes in the combined stack.

* * * * *